(12) United States Patent
Petricek et al.

(10) Patent No.: US 11,055,305 B1
(45) Date of Patent: Jul. 6, 2021

(54) SEARCH RESULT REFINEMENT AND ITEM INFORMATION EXPLORATION

(71) Applicant: Amazon Technologies, Inc., Seattle, WA (US)

(72) Inventors: Vaclav Petricek, Mercer Island, WA (US); Ravendar Lal, Lynnwood, WA (US); Taruja Sanjay Parande, Redwood City, CA (US); Rahul Hemant Bhagat, Issaquah, WA (US); Kemal Oral Cansizlar, Seattle, WA (US); Vishnu Narayanan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/195,166

(22) Filed: Nov. 19, 2018

(51) Int. Cl.
*G06F 3/048* (2013.01)
*G06F 16/25* (2019.01)
*G06F 16/248* (2019.01)
*G06F 16/2452* (2019.01)
*G06F 3/0485* (2013.01)
*G06F 3/0483* (2013.01)

(52) U.S. Cl.
CPC .......... *G06F 16/252* (2019.01); *G06F 16/248* (2019.01); *G06F 16/24522* (2019.01); *G06F 3/0483* (2013.01); *G06F 3/0485* (2013.01)

(58) Field of Classification Search
None
See application file for complete search history.

(56) References Cited

U.S. PATENT DOCUMENTS

| | | | |
|---|---|---|---|
| 2016/0350333 A1* | 12/2016 | Sacheti | G06F 16/5838 |
| 2017/0205888 A1* | 7/2017 | Nicholson | G06K 9/2081 |
| 2019/0332721 A1* | 10/2019 | Pathiyattuthody | G06F 16/9535 |

* cited by examiner

*Primary Examiner* — William C Trapanese
(74) *Attorney, Agent, or Firm* — Kilpatrick Townsend & Stockton LLP

(57) ABSTRACT

User interactions with presented content can be tracked and a corresponding user behavior identified. An enhancement trigger can be detected by comparing the user behavior with a pattern of behavior associated with the enhancement trigger. A modified experience can be provided at the user device. The modified experience can include a user interface for interacting with a chat bot.

19 Claims, 21 Drawing Sheets

SEARCH RESULT REFINEMENT AND ITEM INFORMATION EXPLORATION

BACKGROUND

Online retailers may offer a wide range of products of varying permutations. For example, a computer hardware retailer may offer multiple types of monitors or keyboards each with further specifications. Each item offered by the retailer may be associated with helpful information such as product descriptions, questions and answers, reviews, and ratings. A user searching for an item provided by such an online retailer may not know how to effectively communicate a query or interact with a user interface to properly refine their search. For example, to do so, the user may have to navigate through a multiple interfaces or windows to refine their earlier search. The process can be time consuming and frustrating if the user is unable to find what she originally sought out for. Similarly, once the user has identified the interesting item, the user may want to read some of the helpful information about the item. However, depending on the popularity of the item, the amount of helpful information may be considerable. Searching for answers to the user's questions about the item can quickly become time consuming and can lead to frustration when answers are not found. Refinement of search results and searching of item information may also be limited by hardware restrictions which provide limited user interface screen space for these actions.

BRIEF DESCRIPTION OF THE DRAWINGS

Various examples in accordance with the present disclosure will be described with reference to the drawings, in which.

DETAILED DESCRIPTION

Figure 1:
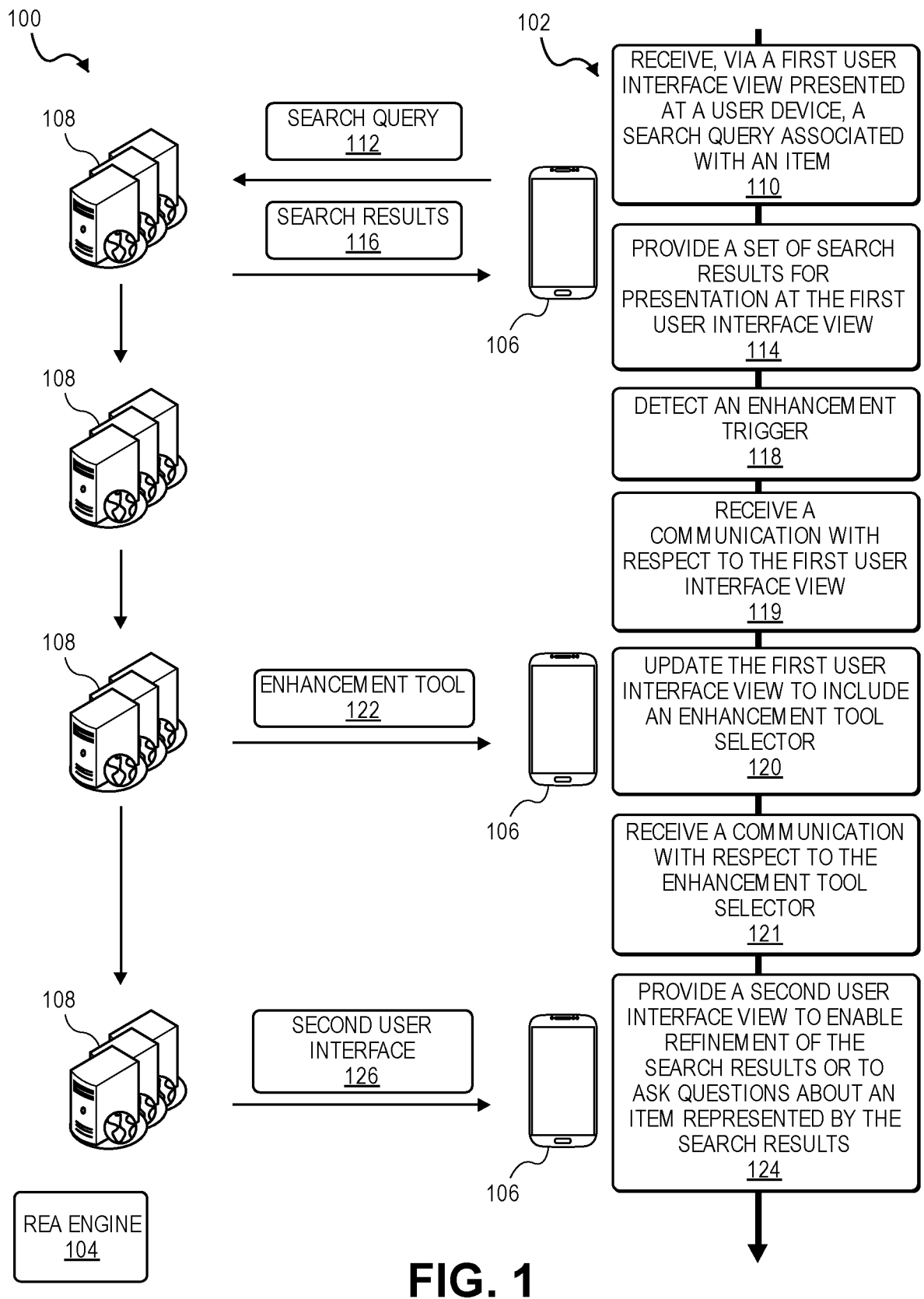
FIG. 1 illustrates an example block diagram and associated flowchart showing a process for implementing techniques relating to result refinement and item information exploration, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples described herein are directed to, among other things, techniques for result refinement and item information exploration as part of a user's search for an item. For example, a large result set based on generic search term can quickly and efficiently be narrowed by a user interacting with an refinement bot, and information about an item can be presented by the user interacting with an item description bot. An option to interact with either of the bots may be presented on the same screen that includes the result set. Once selected, a refinement view may be presented in which the refinement bot suggests filters to add to the result set and takes input from the user to create filters. When the result set has been narrowed, the refinement bot can suggest certain items from the narrowed result set for review by the user. At this point, the user can continue to narrow the result set or select an option to learn more about one of the other items. When this option is selected, an item description view may be presented in which the item description bot receives questions from the user, solicits questions from the user, and suggests questions to the users. To answer the questions, the item description bot may rely on customer reviews, customer questions and answers relating to the item, and other data associated with an item record. An option to purchase the item may be presented in the refinement view and/or in the item description view.

In some examples, the item description view may be presented as part of the user viewing an item description page corresponding to the item. For example, the user may navigate to the item description page in a conventional manner (e.g., selecting the item from a set of search results or entering a detailed search query that finds the item). Once at the item description page, an option to view the item description view and interact with the item description bot may be presented to the user. Once selected, the user may efficiently ask questions and receive answers without having to scroll through seemingly endless pages of comments and questions and answers.

Turning now to a particular example, a system is provided that includes a service provider computer that is configured to maintain item records and provide user interfaces for searching the item records, refining result sets based on the items, and exchanging information about the items. To begin, a search interface view of a user interface can be presented at a user device. Using the search interface view, a user can input a search query (e.g., "flat screen TV"). A result set can be generated from the search query that includes items that match the search query. When the search query is broad or otherwise returns results including multiple items, an option to use a refinement tool may be presented (e.g., as a refinement tool selector or other icon). The option to use the refinement tool can also be presented based on user interactions with the result set that represent an implicit intent of the user to keep searching (e.g., scrolling through the result set, viewing items and returning the result set, and other similar actions). Once the option for the refinement tool has been selected by the user, a refinement interface view is presented. Using the refinement tool within the refinement interface view, the user can interact with a refinement bot to narrow the result set. For example, the refinement interface view may include a chat window for chatting with the refinement bot in a conversational format. The user can input specific terms (e.g., "55 inch", "Brand C", etc.) in the chat window which are interpreted by the refinement bot and applied as filters to the result set. The user can also select terms from a set of predefined terms suggested by the refinement bot (e.g., "good for movies", "good for sports," "newest model", etc.). The refinement bot can also make other suggestions that, when selected by the user, can effectively narrow the result set (e.g., "4 stars and up", "available on VIP club", "under $100", and other such suggestions). Within the refinement interface view can be presented an option to learn more about a particular item. Once the option to learn more about the particular item is selected, a question interface view is presented. Within the question interface view, the user can interact with an item description bot to ask questions about the particular item. For example, the question interface view may include a chat window for chatting with the item description bot in a conversational format. The user can ask her own questions about the particular item by inputting them in the chat window. A set of recommended questions can also be generated and presented to the user in the chat window. These recommended questions and provided answers may inform the user about the particular item using information other users previously found helpful.

The techniques described herein improve the functioning of computer systems that manage item databases and enable searching and refinement of item databases. In particular, because refinement and item information exploration are provided in dedicated chat windows, users can perform searches and refinement efficiently and with fewer mistakes as compared to traditional techniques that require user selection a vast array of potential refinement options and sorting through customer reviews and question and answers. Because of this efficiency and the fact that the users are less likely to have to re-run search queries, user devices are connected to backend service provider computers for less time resulting in bandwidth savings and freeing up resources for other users.

Additionally, as described in some examples, the techniques described herein improve efficiency of using the user devices to perform search queries by reducing the number of clicks, selections, scrolling operations, new webpages, page refreshes, and the like required of a user to refine a result set, learn about an item, and purchase the item. For example, upon detection of a predefined trigger, a user interface can be automatically adjusted to include options for using various tools for refinement and/or item exploration. Using the tools, the user can interact with automated bots that are trained and designed to quickly and efficiently help the user to narrow her search and learn more about an item of interest. Thus, the user can achieve the same end goal (e.g., identifying a product), with far fewer clicks, interface changes, webpages, and the like as compared to conventional systems. For example, using conventional techniques, this same process could include inputting a search query clicking to run a search, clicking to view individual search results, clicking back to the search results, clicking to add a new filter, clicking to refresh the search results, clicking to view individual search results, clicking to view individual questions and answers about a particular item, etc.).

Additionally, the techniques described herein improve an overall refinement/item exploration process by reducing the cognitive load typically associated with such processes. Such reduction is possible because users refine results sets and explore additional information about items using chat windows. Most users are more familiar with using these chat windows than with using detailed searching interfaces including multitudes of search filters. Using the chat windows allows the user to refine the result set and explore information about items using their own natural language that is interpreted by the chat bots.

Turning now to the figures, FIG. 1 is an example block diagram 100 and associated flowchart showing a process 102 for implementing techniques relating to result refinement and item information exploration, according to at least one example. The diagram 100 depicts devices, objects, and the like that correspond to the process 102. The process 102 can be performed by a refinement and exploration (REA) engine 104, which may be implemented in a server computer (e.g., service provider 108) to provide user interfaces in the form of webpages, web services, and the like for facilitating searching of item records, refinement of result sets, interaction with chat bots, and the like. In some examples, at least a portion of the REA engine 104 is implemented by a user device 106 in network communication with the service provider 108. The horizontal arrow represent data and/or requests passing from the user device 106 to the service provider 108 and from the service provider 108 to the user device 106. The vertical arrows correspond to the blocks of the process 102. The REA engine 104, as described herein, may implement a refinement bot 242, an item description bot 264, provide user interfaces, a provide other suitable functions.

The process 102 may begin at 110 by receiving, via a first user interface view presented at a user device (e.g., the user device 106), a search query (e.g., 112) associated with an item. For example, the first user interface view may presented within a user interface of an online store application running on the user device 106 or within a web browser of the user device 106. The search query 112 may be a text string input using a text box presented in the first user interface view. The service provider 108 may parse the search query 112 to identify search parameters for searching one or more search indices associated with one or more databases (e.g., databases including records of items, services, content, and the like available at an online store hosted by the service provider 108). At 114, the service provider 108 may provide a set of search results 116 for presentation at the first user interface view of the user device 106. The set of search results 116 may correspond to a set of items from the databases.

At 118, the process 102 may include detecting an enhancement trigger. This may be performed by the service provider 108. Detection of the enhancement trigger may involve tracking user interactions with presented content (e.g., the search results 116 in this example), and comparing the tracked behavior with a pattern of behavior representing an enhancement trigger. This pattern of behavior can be defined by a set of enhancement rules, and detection of the enhancement trigger occurs when at least one of the set of enhancement rules is fulfilled. In some examples, detection of the enhancement trigger is based on an enhancement score that is computed based on the user interactions and/or earlier user interactions. The enhancement score may represent whether the user could benefit from a modified experience (e.g., presentation of an enhancement tool such as a refinement tool including a refinement bot or item description tool including an item description bot) to either refine the search results 116 and/or explore additional item information. The enhancement trigger may be triggered by triggering information which may include, for example, contextual historical information about the user (e.g., search history, viewing history, purchase history, and/or other information collected outside of this current session), contextual current information about how the user is interacted with the presented content (e.g., the user continues to scroll through the search results, the user clicks on items in the search results but keeps returning to the search results, and other similar information indicating that the user is likely to keep searching), and/or any other tracked information that indicates that the user could benefit from a modified experience with the content.

At 119, the process 102 may include receiving a communication with respect to the first user interface view. This may be performed by the service provider 108. The communication may function as a request from the user device 106 for additional and/or updated information to be presented at the user device 106.

At 120, the process 102 may include updating the first user interface view to include an enhancement tool selector corresponding to an enhancement tool 122. This may be performed by the service provider 108. In some examples, the set of search results 116 is broad and includes more than one search result corresponding to more than one item. In this example, the enhancement trigger may be detected because, given the large number of search results in the set of search results 116, the user could benefit from a refinement tool to narrow her search, as described herein. In some examples, if the set of search results 116 includes fewer search results, the enhancement trigger may still be detected because, given the small number of search results in the set of search results 116, the user may be ready to learn about an item using an item description tool, as described herein. Thus, presentation of the enhancement tool selector may depend, at least in part, on whether the service provider 108 determines that the user's behavior is similar to a predefined pattern of behavior.

In some examples, the enhancement tool selector corresponding to the enhancement tool 122 is presented at an edge or corner of the first user interface view or in some other non-obtrusive manner so as to not distract the user from her search. In this manner, the enhancement tool can be presented as a suggestion to interact with the enhancement tool 122.

At 121, the process 102 may include receiving a communication with respect to the enhancement tool selector corresponding to the enhancement tool 122. This may be performed by the service provider 108 and may be in response to user input received at the user device 106 that selects the enhancement tool selector. The communication may function as a request from the user device 106 for additional and/or updated information to be presented at the user device 106 (e.g., a modified or enhanced experience).

At 124, the process 102 may include providing a second user interface view 126 to enable refinement of the search results or to ask questions about an item represented by the search results. In some examples, this may be performed by the service provider. The second user interface view may be a refinement interface view for interacting with the refinement tool or a question interface view for interacting with the item description tool. In some examples, the second user interface view may depend on which enhancement tool selector is presented at 122.

Figure 2:
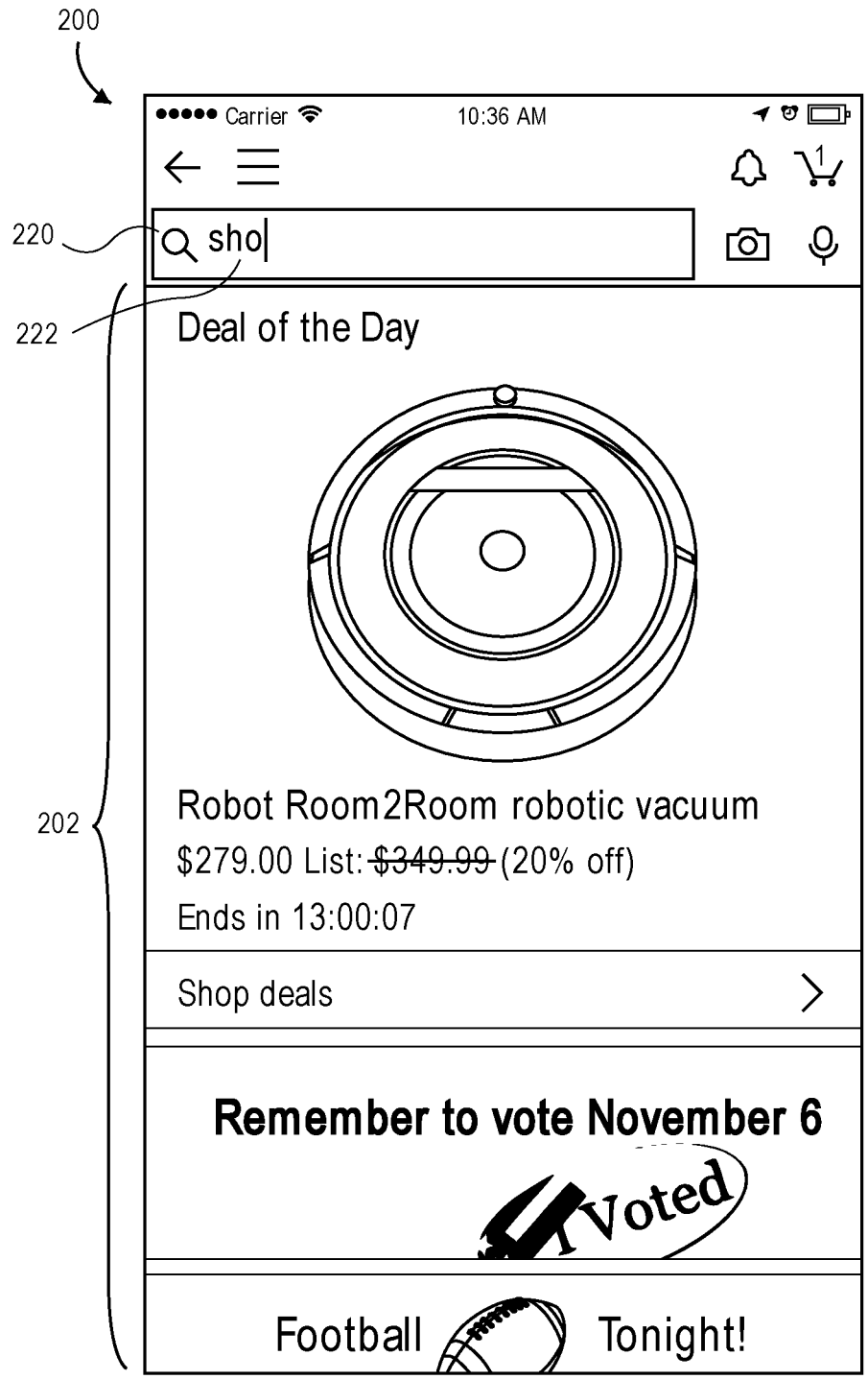
FIG. 2 illustrates an example user interface for implementing techniques relating to result refinement and item information exploration, according to at least one example.

FIGS. 2-16 illustrate example user interfaces, according to various examples. It should be noted that FIGS. 2-15 represent progressions of various conversations between a user utilizing a user device (e.g., the user device 106) to interact with a user interface presenting features described herein and responses by the service provider computer. Similar reference numbers will be utilized to represent the same inputs, variables, actions, or features as needed throughout the figures to maintain the depiction of the progression. In FIG. 2, a user interface 200 is presented via a user device (e.g. the user device 106), that includes an initial user interface view 202 that includes a user interface area 220 for providing input 222 (e.g., "shoes"). The initial user interface view 202 may represent a landing page or home page of the user interface 200, when the user interface 200 is first accessed. Thus, the initial user interface view 202 may include depictions of various items that are available for purchase at the online store, promotions, and other such information. In some examples, this information is presented in the form of user interface cards that can be dismissed, moved, and otherwise interacted with. A user may input the input 222 to begin the process of searching the online store for items matching the input 222 (e.g., a search query).

Although FIG. 2 illustrates one process for initiating result refinement and information exploration features described herein, examples are not limited to this particular process for initiating the features. For example, the result refinement and information exploration features described herein can be utilized with other existing search services or other search contexts not related to items or item categories. In some examples, a link to a refinement feature service implemented by the service provider computers may be provided to a user via an application interface, a menu option, or users can begin a chat experience without providing a specific query. In such cases, the system may query the user for what they are looking for and optionally provide refinements such as "shop for shoes," "explore board games," or "continue your search for televisions."

Figure 3:
FIG. 3 illustrates an example user interface for implementing techniques relating to result refinement and item information exploration, according to at least one example.

FIG. 3 illustrates the user interface 200 presented via a user device that includes the previously provided input 22 ("shoes"). In FIG. 3, the initial user interface view 202 has been updated and/or replaced by a search results interface view 203. The search results interface view 203 includes search results 224 corresponding to items associated with the input 222. Because of the breadth of the input 222 (e.g., shoes), the number of search results 224 is very larger (e.g., results counter 228 indicating 41,611 results). As illustrated, the search results 224 include different types of shoes (e.g., men's shoes, women's shoes, and children's shoes).

The search results interface view 203 includes a conventional filter tool 226 that can be used to manually filter the search results 224. As described herein, doing so may be time consuming and difficult for some users.

Accordingly, the search results interface view 203 may also include an enhancement tool selector 230. Generally, the enhancement tool selector 230 is triggered for display in the search results interface view 203 when a user could benefit from one or more enhancement tools. In some examples, the presentation of the enhancement tool selector 230 is triggered as part of each search executed by the service provider. In other examples, presentation of the enhancement tool selector 230 is triggered by triggering information, such as, when the number of search results 224 exceeds some fixed threshold (which may be particular to a category of items), when the search results 224 include items from more than one item category, when current contextual information about the user's interactions indicates that user would benefit from an enhancement tool, when user actions with respect to the search results interface view 203 indicate an intent to refine the search results 223, and/or based on any other suitable triggering information. For example, if the tracked user interaction is a scrolling input 229 that is indicative of the user scanning through all of the search results, this action may function as triggering information to trigger presentation of the enhancement tool selector 230.

Figure 4:
FIG. 4 illustrates an example user interface for implementing techniques relating to result refinement and item information exploration, according to at least one example.

FIG. 4 illustrates the user interface 200 including an alternative version of the search results interface view 203 and an alternative version of the enhancement tool selector 230, depicted as an refinement input box 232, which is a type of refinement tool. The refinement input box 232 may include a message input area 231, a send button 233 for sending messages input in the message input area 231, and one or more refinement buttons 235. Presentation of the refinement input box 232 can be triggered using similar approaches as discussed with reference to the enhancement tool selector 230. The refinement input box 232 may be configured to receive free form text input in the message input area 231, parse the text to identify filtering terms, and update the search results 224 based on the filtering terms. For example, a user may input text into the message input area 231 and the service provider may determine from the text whether a filter can be applied to the search results 224, all without having to access the conventional filter tool 226. In some examples, the search results interface view 203 may be updated to represent filters that have been added through the refinement input box 232. For examples, these filters can be shown following the input 222. In some examples, the refinement input box 232 may include the same or similar functionality as the refinement bot 242 described with reference to FIGS. 5-7. The refinement input box 232 may also be configured to present one or more refinement buttons 235. The refinement buttons 235 may present recommended filters for filtering the search results 224. For example, the refinement buttons 235 include the options of filtering based on "Top Rated" (235a), "Get Tomorrow" (235b), and "Brown" (235c). The service provider may determine which options to present based on the context of the search, customer information, and any other suitable information. The content of the refinement buttons 235 may change based on this same set of information and/or may be updated based on selection of other filters. For example, selection of the refinement button 235a, may cause a fourth refinement button 235 to appear in place of the refinement button 235a. This selection may also cause a different refinement button 235 to replace one of the refinement buttons 235b or 235c.

Figure 5:
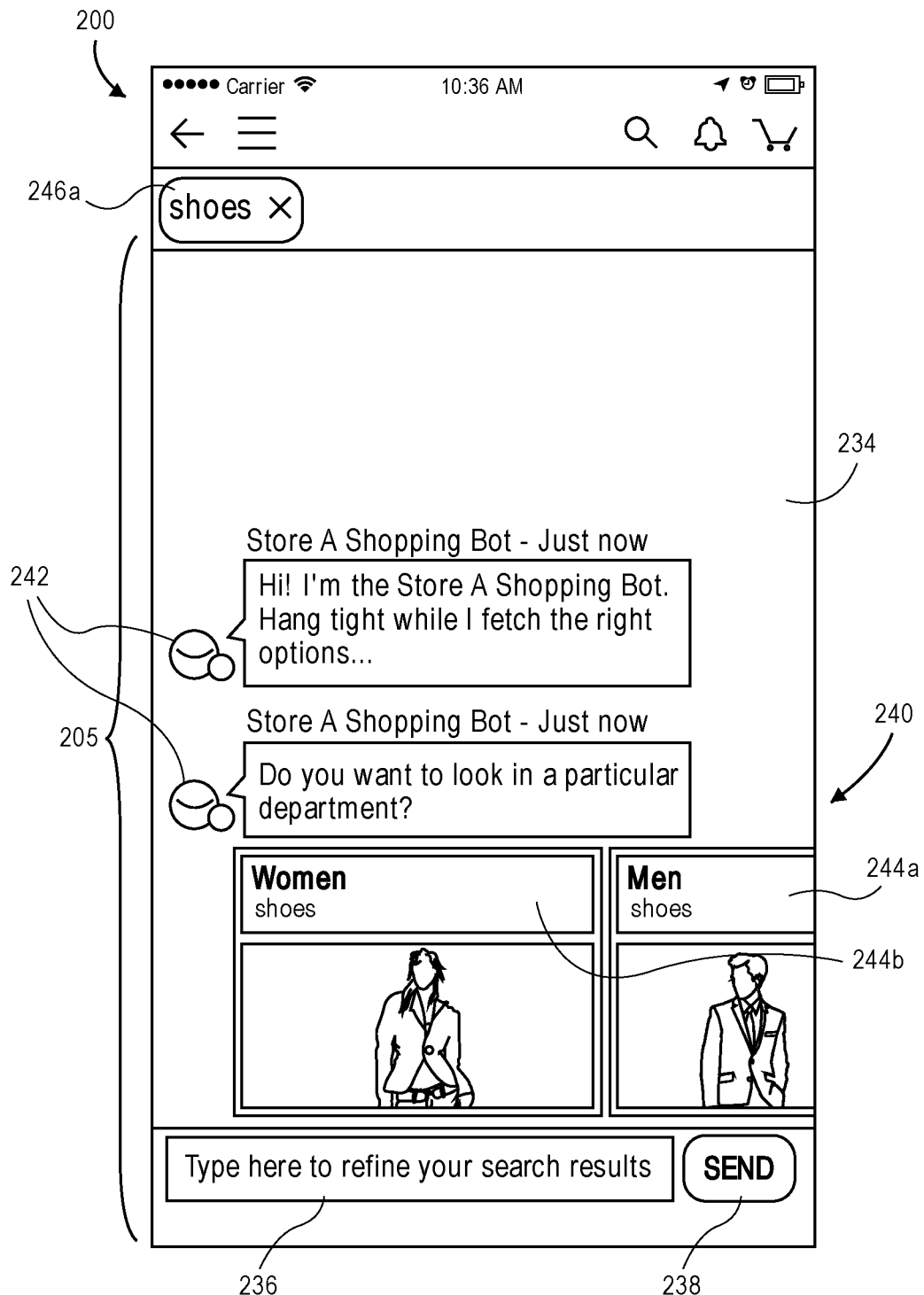
FIG. 5 illustrates an example user interface for implementing techniques relating to result refinement and item information exploration, according to at least one example.

FIG. 5 illustrates the user interface 200 presented via the user device after the enhancement tool selector 230 has been selected (e.g., by user input). In the version of the user interface 200 illustrated in FIG. 5, the search results interface view 203 has been replaced by a refinement interface view 205. The refinement interface view 205 is presented as a chat window 240, including a chat view 234, a message input box 236, and a send message button 238.

Within the chat window 240, the user is enabled to interact with a chat bot referred to herein as the refinement bot 242. The refinement bot 242 can be implemented as part of the REA engine 104. For example, the refinement bot 242 may be a computer program and/or artificial intelligence module, which may be implemented by the service provider. The refinement bot 243 presents prompts or questions to the user within the chat view 234. The user can respond to these prompts and questions by inputting text at the message input box 236 and hitting the send message button 238.

The refinement bot 242 can present suggestions for filters in the chat view 234. For example, as illustrated in FIG. 5, the chat view 234 includes options for refining the search based on a particular department. Thus, the refinement interface view 205 may include recommended department filters 244 (e.g., a men's department filter 244a and a women's department filter 244b) to refine the search results to different departments of shoes such as women's shoes, men's shoes, etc. Other filters based on product type, category, etc. may also be provided. The refinement bot 242 may determine which filters to present based on a policy learned from customer behavior and implicit feedback (e.g., did users purchase more frequently when a particular filter was suggested), explicit choice of past users when browsing an online store by navigating the category drill-down, filters the user used in the past (e.g., personalized filters), popular filters, business rules, user filter choices selected from available filter choices, and/or any other suitable information.

The message input box 236 is configured to receive input from a user that not only responds to prompts, but also that is unprompted. For example, the user can input text that can then be processed by the service provider to identify one or more filters represented in the text (e.g., "I want shoes for outdoors" may be mapped to a search filter "outdoor shoes"). In some examples, if the text cannot be mapped directly to an existing search filter, the text or some portion of the text may still be added as a filter (e.g., the term "dad shoes" can added as the search filter "'dad shoes'"). Representations of these filters are presented as new filter indicators 246 (e.g., along with the indicator shoes 246a). As illustrated with additional FIGS., as additional filters are included they are represented by additional filter indicators 246. The filters can be easily dismissed by simply selecting the "X" in the filter indicator 246.

Figure 6:
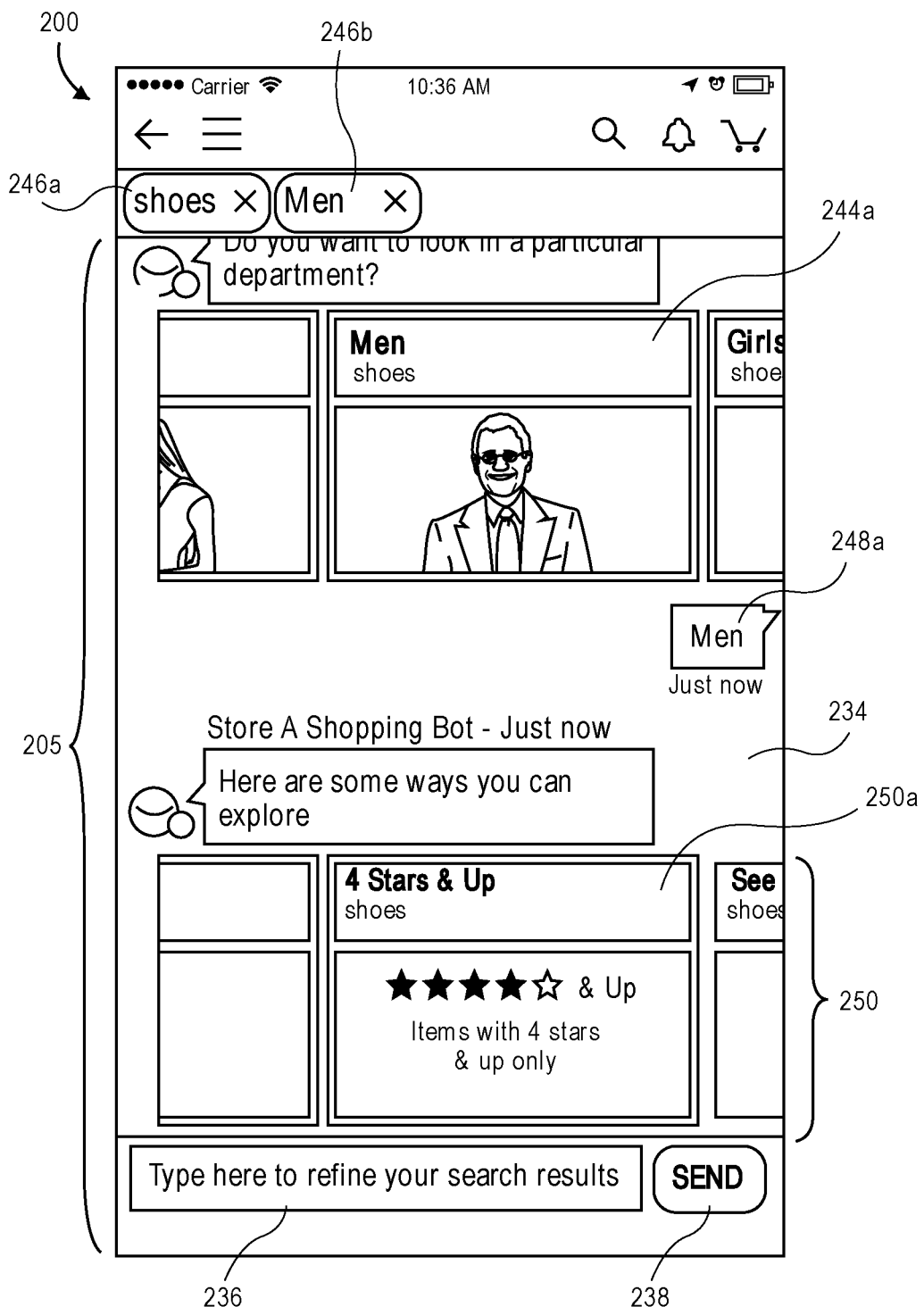
FIG. 6 illustrates an example user interface for implementing techniques relating to result refinement and item information exploration, according to at least one example.

FIG. 6 illustrates the user interface 200 presented via the user device after the men's department filter 244a has been selected in the chat view 234 shown in FIG. 5 (e.g., by user input received at the refinement interface view 205). Thus, in the version of the user interface 200 illustrated in FIG. 6, the content in the chat window 234 has been updated. For example, a record of the user's selection of the men's department filter 244a is represented by user comment 248a. Following the user comment 248a, the refinement bot 242 has responded by suggesting additional filters 250 (e.g., "some more ways you can explore"). For example, the additional filters include a rating filter 250a that limits the search results to items rating four stars and up. Other additional filters 250 may also be applied such as, for example, items associated with a VIP shopping program, prices, ranking, and any other suitable data by which the search results can be filtered. To view the additional filters 250 the user may scroll the additional filters 250 right to left. The refinement interface view 205 has also been updated to include a filter indicator 246b corresponding to the earlier selection of the men's department filter 244a. The refinement bot 242 may suggest additional filters 250 based on a policy learned from customer behavior and implicit feedback (e.g., did users purchase more frequently when a particular filter was suggested), explicit choice of past users when browsing an online store by navigating the category drill-down, filters the user used in the past (e.g., personalized filters), popular filters, business rules, user filter choices selected from available filter choices, and/or any other suitable information.

Figure 7:
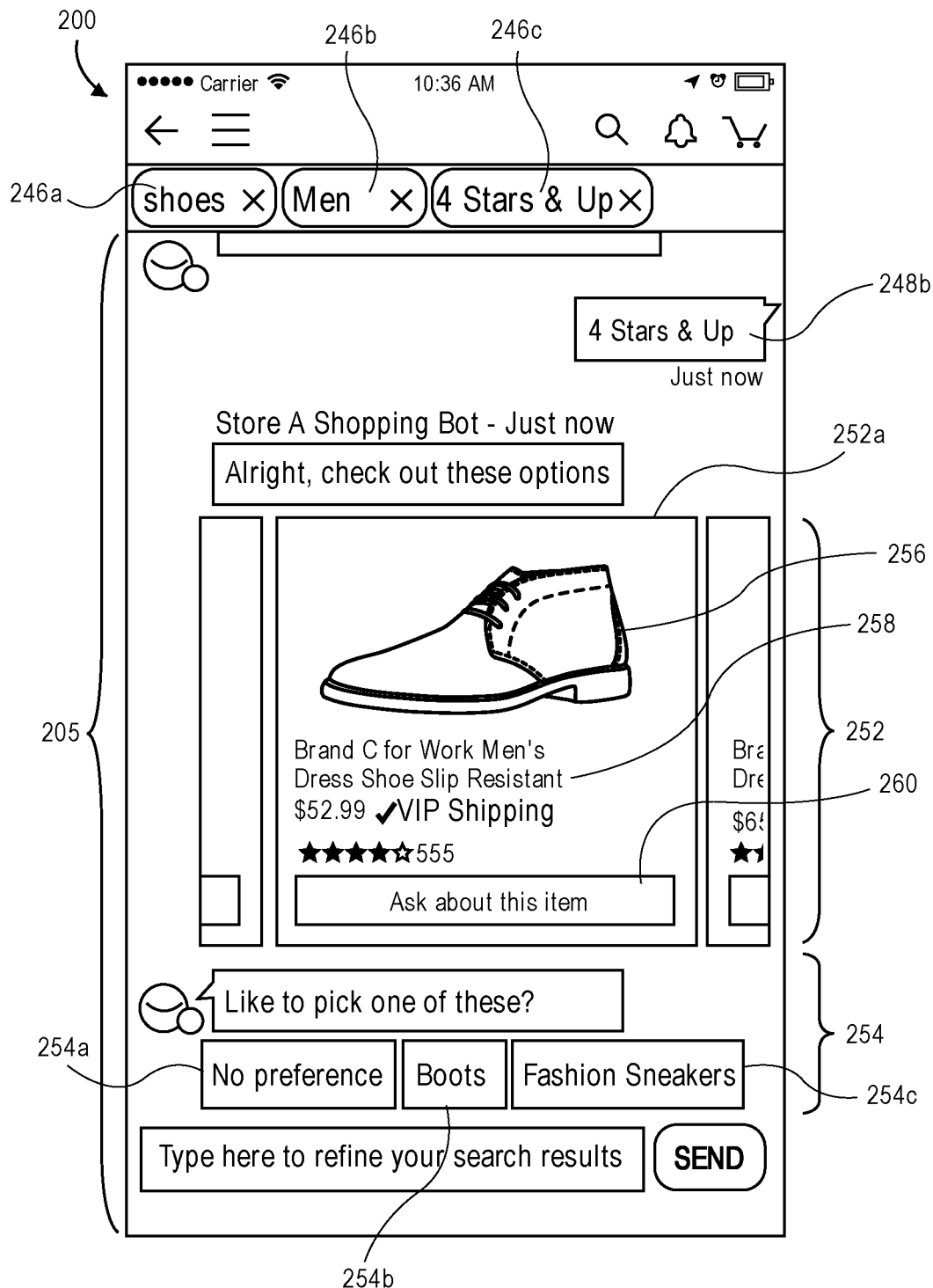
FIG. 7 illustrates an example user interface for implementing techniques relating to result refinement and item information exploration, according to at least one example.

FIG. 7 illustrates the user interface 200 presented via the user device after the rating filter 250a has been selected in the chat view 234 shown in FIG. 6 (e.g., by user input received at the refinement interface view 205). Thus, in the version of the user interface 200 illustrated in FIG. 7, the content in the chat window 234 has been updated. For example, a record of the user's selection of the rating filter 250 is represented by the user comment 248b. Following the user comment 248b, the refinement bot 242 has responded by presenting a set of recommended items 252 and presenting a set of recommended search filters 254. Selection of any one of the recommended search filters 254 may function to further refine the search results 224. For example, selection of the recommended search filter 254b may refine the search results 224 to only include items that match the active filters: shoes, men's, 4 stars and up, and boots. The recommended search filters 254 may be generated based at least in part on contextual information associated with the user (e.g., search history, browsing history, location, profession, etc.) and/or associated with other users. The refinement bot 242 may determine the recommended search filters 254 based on a policy learned from customer behavior and implicit feedback (e.g., did users purchase more frequently when a particular filter was suggested), explicit choice of past users when browsing an online store by navigating the category drill-down, filters the user used in the past (e.g., personalized filters), popular filters, business rules, user filter choices selected from available filter choices, and/or any other suitable information.

The set of recommended items 252 may correspond to a subset of the search results 224. In particular, the set of recommended items 252 may be generated based on the search filters as represented by the filter indicators 246. Each recommended item 252 may include an item image 256, an item description 258, and more information button 260 (e.g., "ask about this item" button). In some examples, selecting the item image 256 and/or the item description 258 (e.g., clicking on these items) may link to an item description interface view for the recommended item 252a. From this view, the user may be enabled to research about the recommended item 252 by reading customer reviews, and questions and answers, and comparing with other items. From this view, the user may also purchase the recommended item 252a.

Selecting the more information button 260 may present a new user interface view including an item description tool that enables the user to ask questions about the recommended item 252a. This view is illustrated in FIG. 8.

Figure 8:
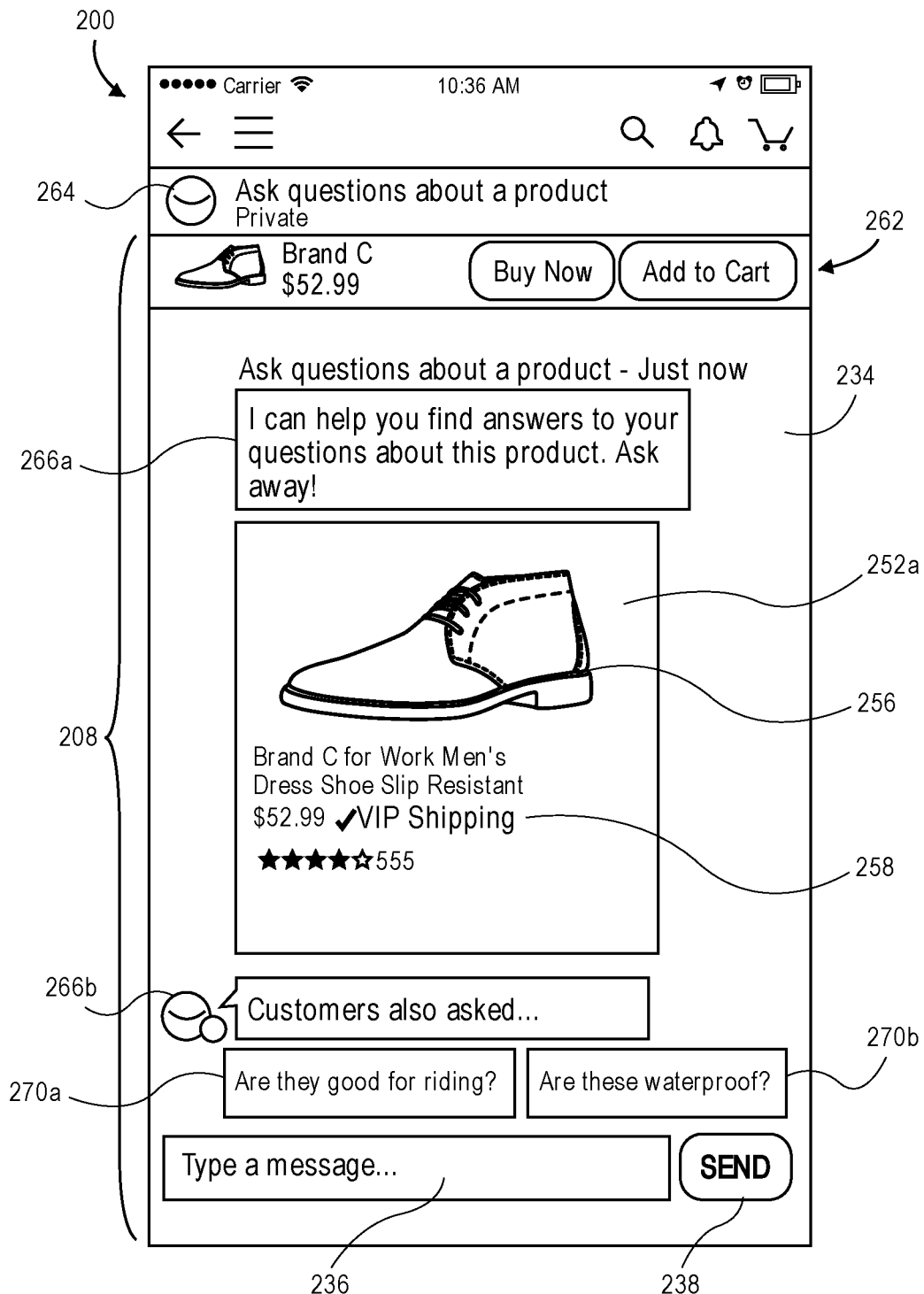
FIG. 8 illustrates an example user interface for implementing techniques relating to result refinement and item information exploration, according to at least one example.

FIG. 8 illustrates the user interface 200 presented via the user device after the more information button 260 has been selected (e.g., by user input). In the version of the user interface 200 illustrated in FIG. 8, the refinement interface view 205 has been replaced by a question interface view 208. The question interface view 208 is presented as a question chat window 262, including similar objects performing similar functions as the chat window 240 (e.g., the chat view 234, the message input box 236, and the send message button 238). The question interface view 208 is devoted to discussing the recommended item 252a.

Within the question chat window 262, the user is enabled to interact with a chat bot referred to herein as the item description bot 264. The item description bot 264 can be implemented as part of the REA engine 104. For example, the item description bot 264 may be a computer program and/or artificial intelligence module, which may be implemented by the service provider. The item description bot 264 presents prompts or questions to the user within the chat view 234. The user can respond to these prompts and questions by inputting text at the message input box 236 and hitting the send message button 238.

The item description bot 264 can help the user find answers to questions about the recommended item 252a. For example, the item description bot 264 may first present a message 266a that introduces the item description bot 264 and identifies the recommended item 252a. The next message from the item description bot 264 (e.g., message 266b) may include a set of recommended questions 270. The set of recommended questions 270 can be generated based on existing questions previously posed by customers for which an answer exists. The set of recommended question 270 and other such data from the detail page can be surfaced in the chat view 234 without receiving user input. In other words, the system may select the most relevant questions to be presented without the user inputting information at the message input box 236. In some examples, the item description bot 264 may generate the recommended questions 270 based on questions the user asked recently on other items (in the same product category), questions the user has asked in search box, questions the user has asked customer service representatives, questions the user has viewed or interacted with on product detail page (of similar product), random questions, popular questions, questions that are frequent follow-up questions to a question the user or a different user expressed before, questions that are representative of the types of questions the system collected answers to (shipping, durability, function, etc.), frequently asked/viewed questions, top rated questions, informative questions that correlate with purchase decisions, and/or any other suitable information pertaining to questions about items. The set of recommended questions 270 can be ranked by relevance or in any other suitable manner. In this example, determining which questions to present may be based on the relevance ranking. In other examples, questions may be presented based on their ability to help customers make a purchase decision.

In some examples, the questions and the answers may be sourced from customer-provided information (e.g., other customers who have experience with the recommended item 252). In some examples, the questions and answers may be stored in association with a record of the recommended item 252. In some examples, the set of recommended questions 270 is pre-generated, but may also be generated dynamically in response to the user requesting the question interface view 208 or otherwise requesting an interaction with the item description bot 264 (e.g., outside of the question interface view 208).

Figure 9:
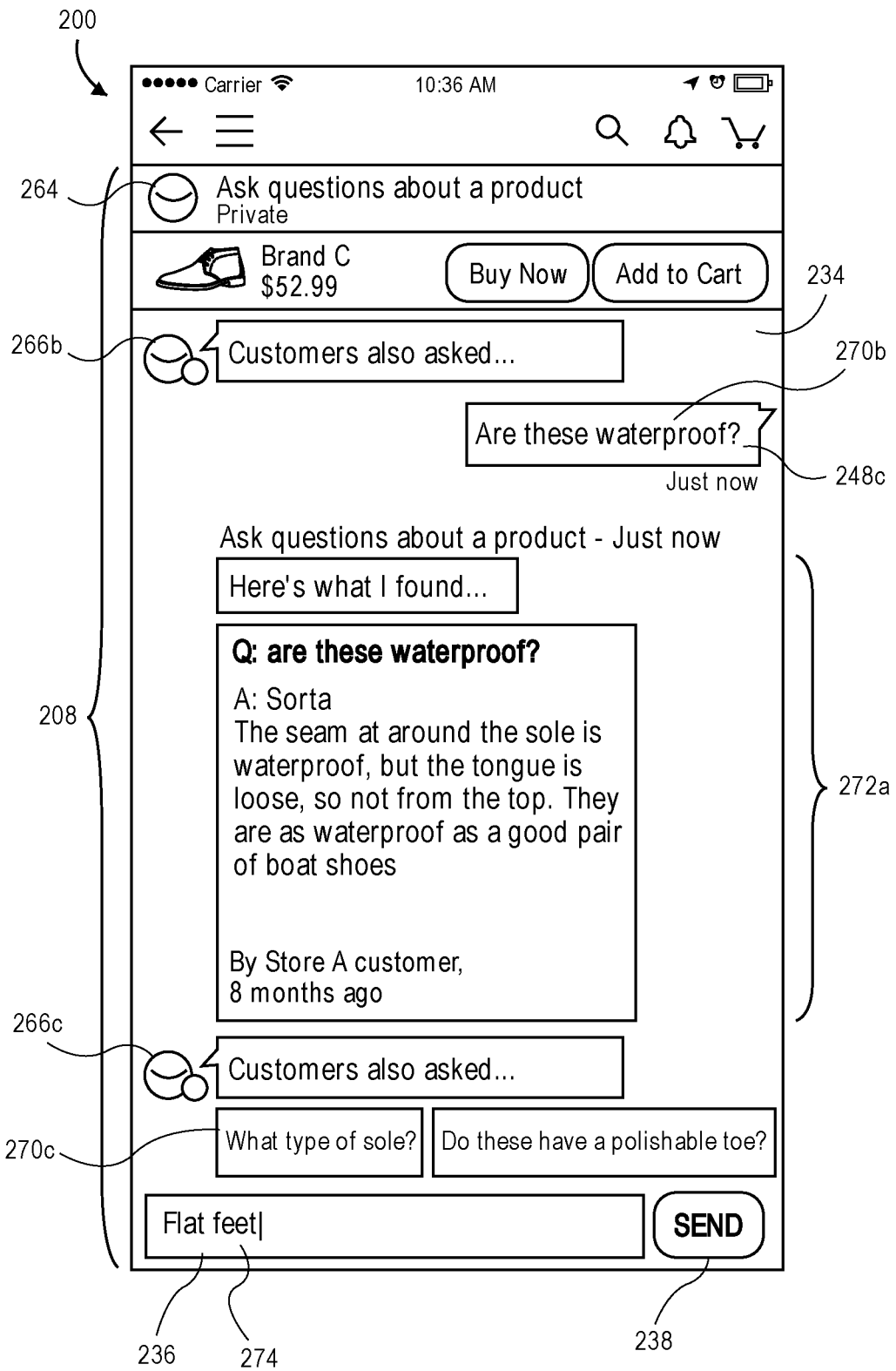
FIG. 9 illustrates an example user interface for implementing techniques relating to result refinement and item information exploration, according to at least one example.

FIG. 9 illustrates the user interface 200 presented via the user device after the recommended question 270b has been selected in the chat view 234 shown in FIG. 8 (e.g., by user input received at the question interface view 208). Thus, in the version of the user interface 200 illustrated in FIG. 9, the content in the chat window 234 has been updated. For example, a record of the user's selection of the recommended question 270b (e.g., "Are these waterproof?"), is represented by a user comment 248c in the chat view 234. Moreover, responsive to selection of the recommended question 270b, an answer 272a has been presented in the question interface view 208. The answer 272a corresponds to the recommended question 270b. In some examples, the recommended question 270b and the corresponding answer 272a are selected because other customers have indicated that they are helpful (e.g., by a process of up-voting or down-voting answers with respect to helpfulness, and, in some examples, the answers as well). The answer 272 may identify a user who originally submitted the answer 272a. The user may review the answer 272 as part of deciding whether to purchase the recommended item 252. In some examples, the recommended question 270b and/or other elements presented in the chat view 234 may be selectable and may link to other content. For example, selection of the recommended question 270b may link to the actual question and answer in the item description view for the item being discussed. This may be achieved using deep linking between this interactive experience and the item record.

The item description bot 264 may also present additional recommended questions 270c and 270d. The additional recommended questions 270c and 270d can be generated based on existing questions previously posed by customers, the other recommended questions 270, the answers 272, all the same information the first question was based on, interaction with the answer and any implicit feedback (dwell time, thumbs up/down), sentiment and positivity/negativity of the answer (first question: "is item waterproof?", first answer: "no", and second question: "is item water resistant?"), questions other users who asked similar question asked (after), questions user asked right before purchasing the item, and/or any other information pertaining to questions about items.

As discussed previously, the user may also input her own questions using the message input box 236. For example, the user can input text at the message input box 236 that represents the question and may hit the send message button 238 to pass the text to the service provider. Once received, the service provider can parse the text to determine whether a question is present in the text. If so, the service provider may determine a corresponding answer to the question. For example, as illustrated in FIG. 9, the user may input user question 274 (e.g., the phrase "flat feet") and hit the send message button 237. The next version of the question interface view 208 following this action is illustrated in FIG. 10.

Figure 10:
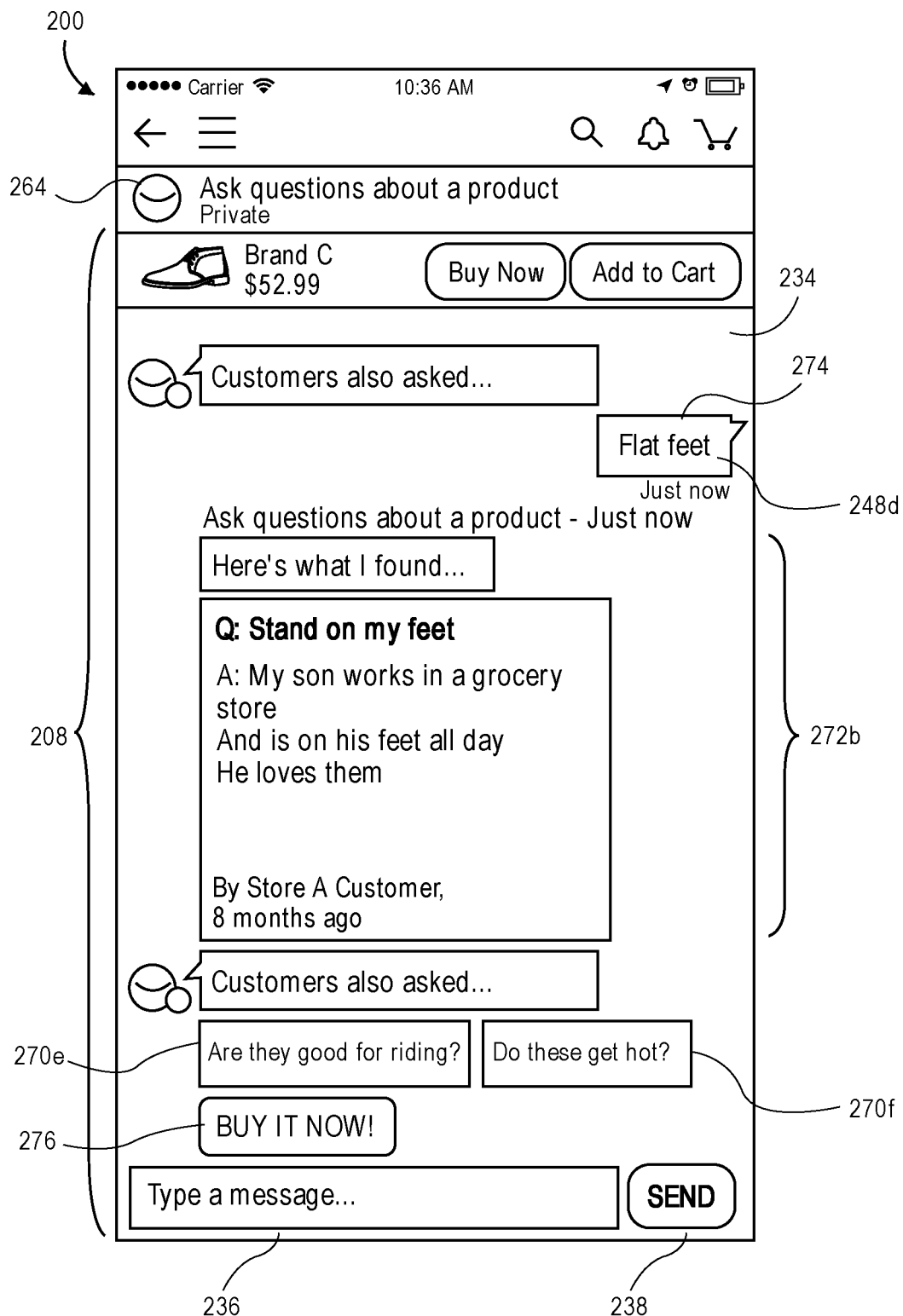
FIG. 10 illustrates an example user interface for implementing techniques relating to result refinement and item information exploration, according to at least one example.

FIG. 10 illustrates the user interface 200 presented via the user device after the user question 274 has been input in the message input box 236 shown in FIG. 9. Thus, in the version of the user interface 200 illustrated in FIG. 10, the content in the chat window 234 has been updated. For example, a record of the user's selection of the user question 274 (e.g., "flat feet"), is represented by the user comment 248d in the chat view 234. Moreover, responsive to selection of the user question 274, an answer 272b has been presented in the question interface view 208. The answer 272b may be sourced in a similar manner as the answer 272a. The answers 272 may function as interactive knowledge cards sourced from the same or similar items. In some examples, selection of the answers 272 may cause an item detail page to load.

The item description bot 264 may also present additional recommended questions 270e and 270f. The item description bot 264 may also present an option to purchase the recommended item 252a. This may be presented, in some examples, as a buy it now button 276. The buy it now button 276 may be presented at any suitable location within the question interface view 208. In some examples, an add to cart button is also included in addition to or in place of the buy it now button 276.

Figure 11:
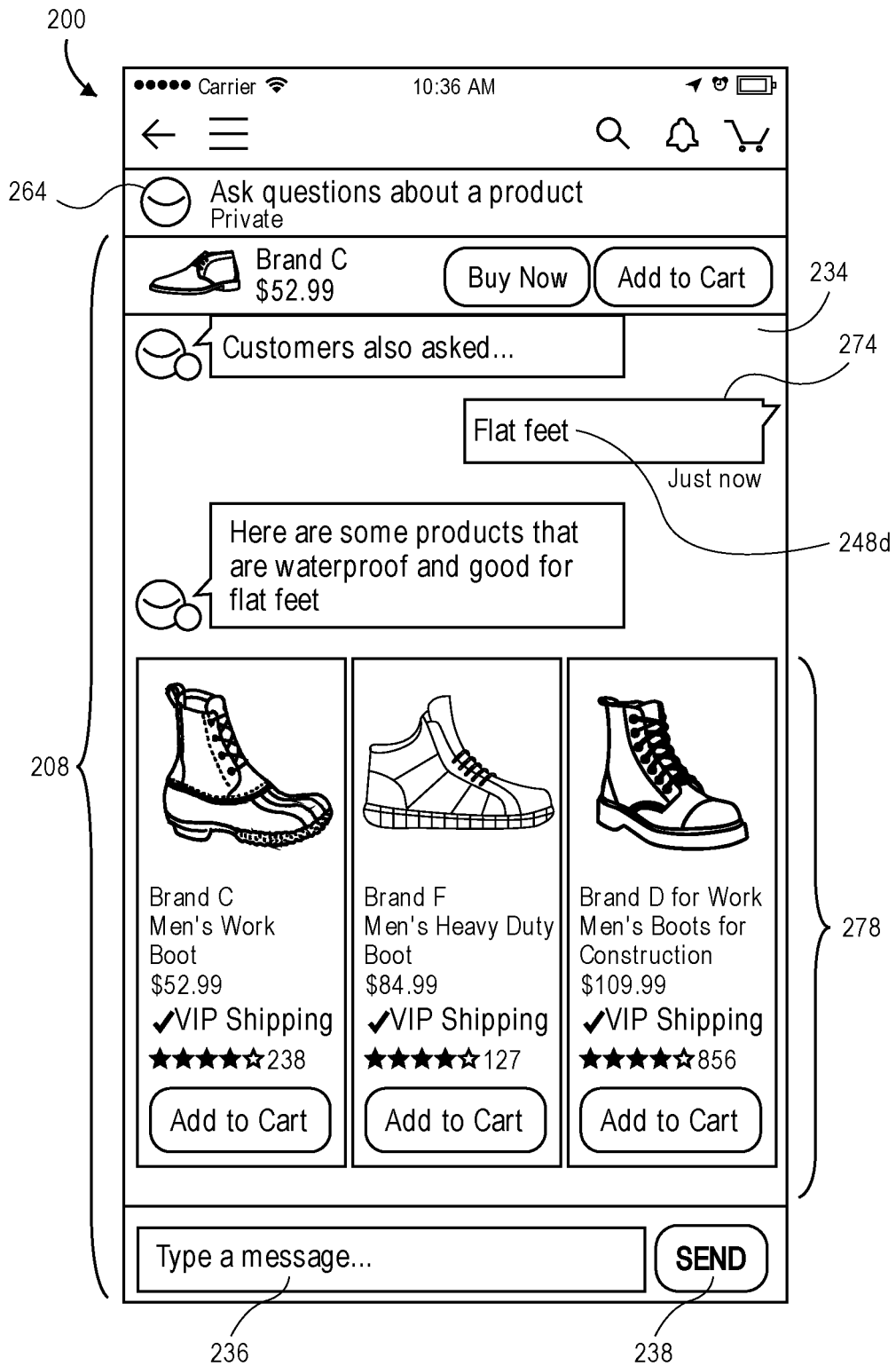
FIG. 11 illustrates an example user interface for implementing techniques relating to result refinement and item information exploration, according to at least one example.

FIG. 11 illustrates the user interface 200 presented via the user device after the user question 274 has been input in the message input box 236 shown in FIG. 9. FIG. 11 is an alternative version of FIG. 10. In the version of the user interface 200 illustrated in FIG. 11, the content in the chat window 234 has been updated. For example, a record of the user's selection of the user question 274 (e.g., "flat feet"), is represented by the user comment 248d in the chat view 234. In this example, however, responsive to selection of the user question 274, instead of an answer, the item description bot 264 has presented an additional set of recommended items 278 in the chat view 234. The set of recommended items 278 may be recommended to the user based on the question(s) previously posed to the item description bot 264 (e.g., the user question 274 and the recommended question 270b). Thus, the recommended items 278 may include shoes that are both good for flat feet (e.g., the user question 274) and waterproof (e.g., the recommended questions 270b), in addition to being "men's" "shoes" and "4 stars and up" as previously filtered. In some examples, additional recommended items 278 in the set of recommended items 278 are revealed by scrolling right and left. In some examples, the user can add any one of the recommended items 278 to a cart or otherwise purchase the recommended items 278.

Figure 12:
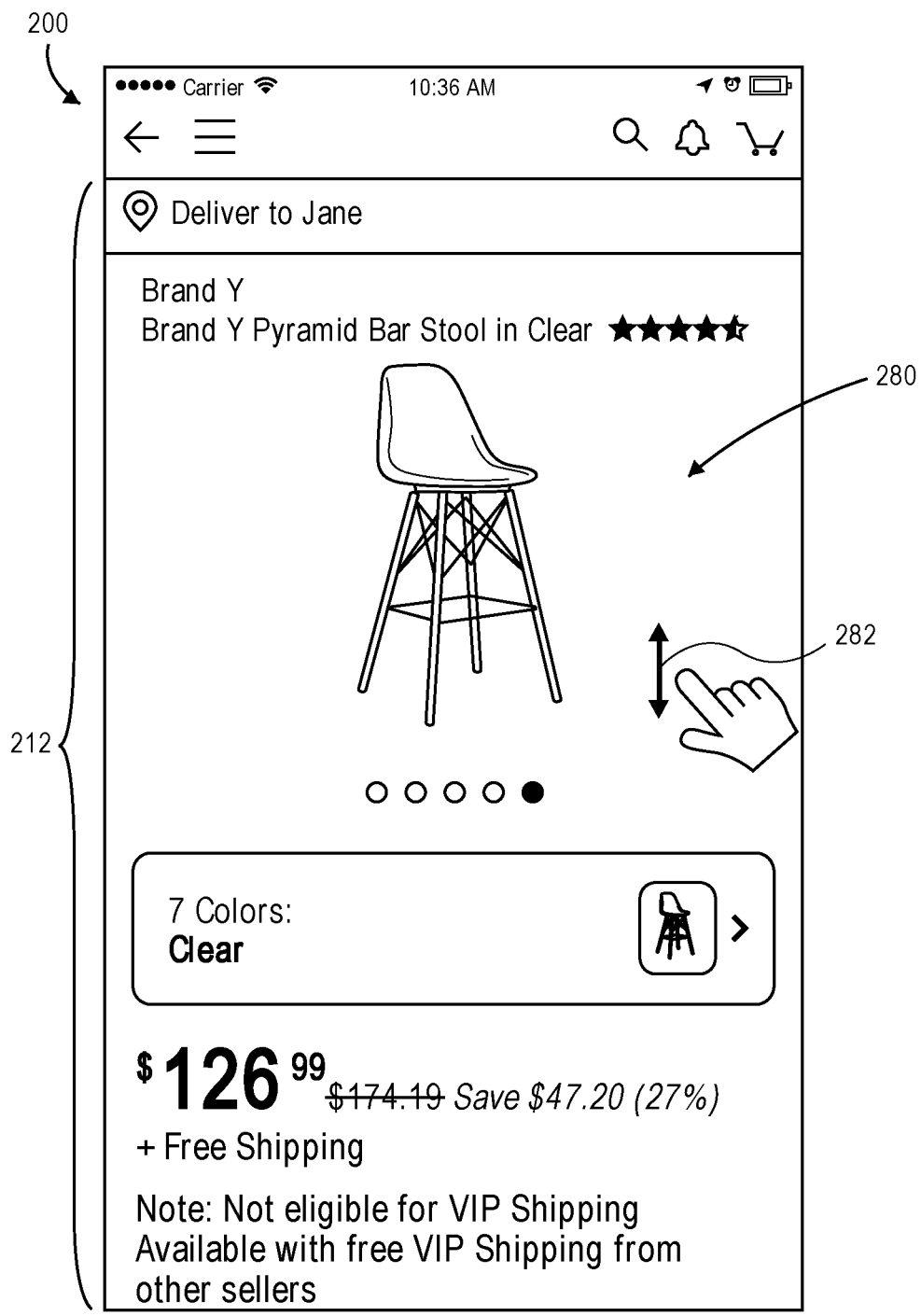
FIG. 12 illustrates an example user interface for implementing techniques relating to result refinement and item information exploration, according to at least one example.
Figure 13:
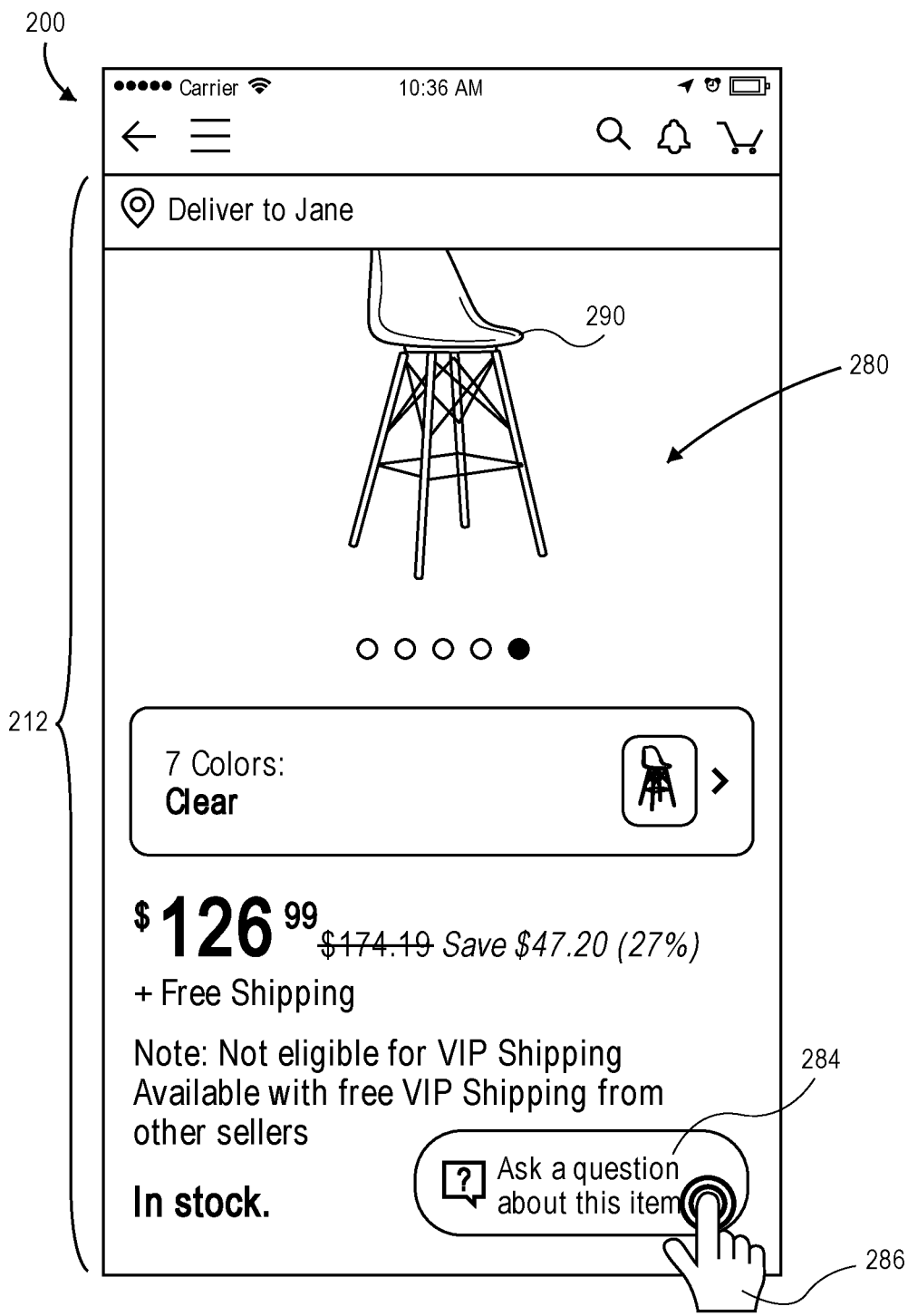
FIG. 13 illustrates an example user interface for implementing techniques relating to result refinement and item information exploration, according to at least one example.

FIG. 12 illustrates the user interface 200 presented via the user device that includes an item description interface view 212 according to at least one example. The item description interface view 221 may include item details 280 (e.g., title, rating, picture(s), options for purchase, purchase price, questions and answers, etc.). Conventionally, to access questions and answers about the item, the item description interface view 212 may be scrolled down using a scrolling input 282. In some examples, such scrolling may trigger presentation of an enhancement tool selector 284 (e.g., the enhancement tool selector 230), as illustrated in FIG. 13. Selection of the enhancement tool selector 284 (e.g., based on user input 286), may cause presentation of the question interface view 214, as shown in FIG. 14, that is used for reviewing questions and answers in a chat-based format with the item description bot 264.

Figure 14:
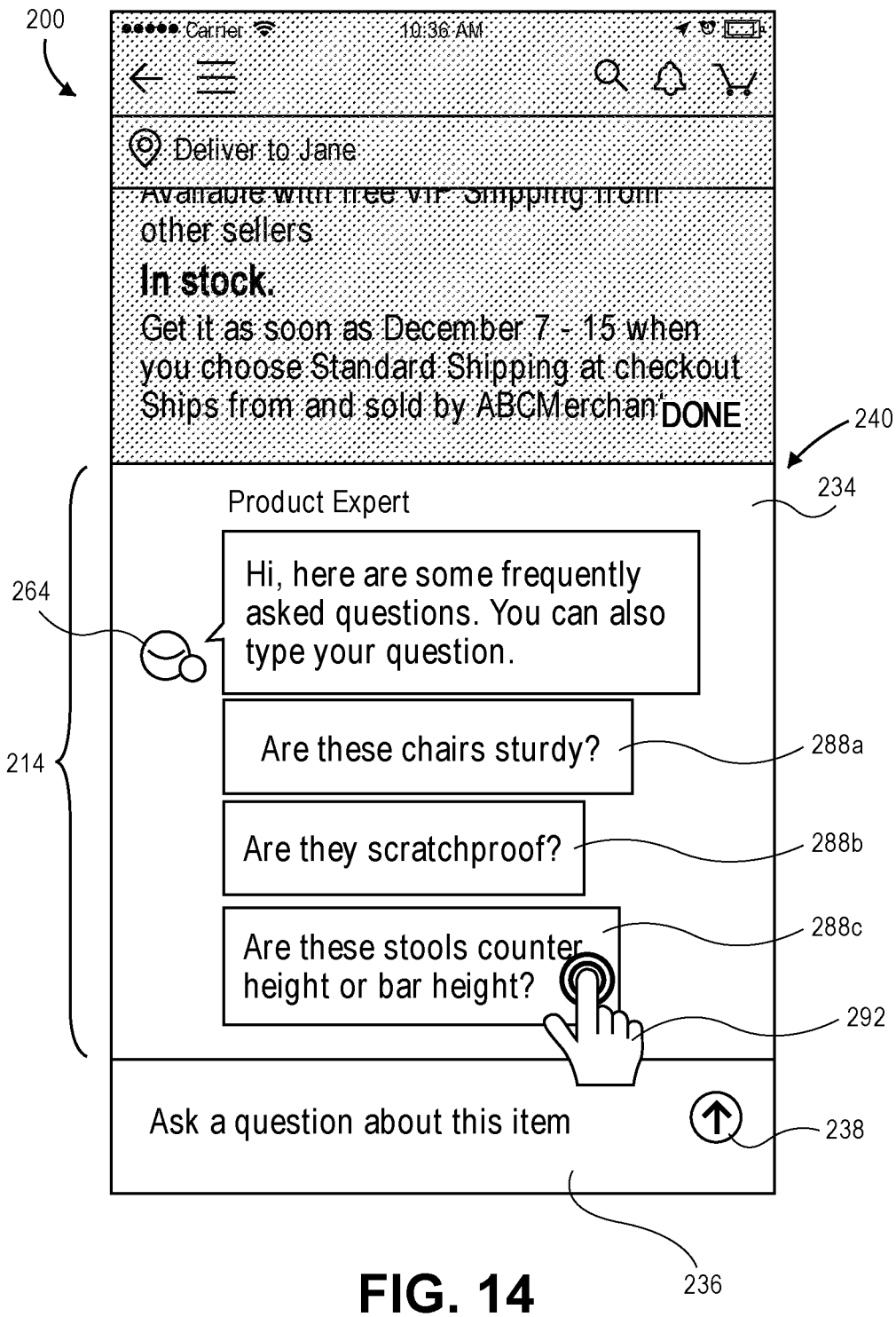
FIG. 14 illustrates an example user interface for implementing techniques relating to result refinement and item information exploration, according to at least one example.
Figure 15:
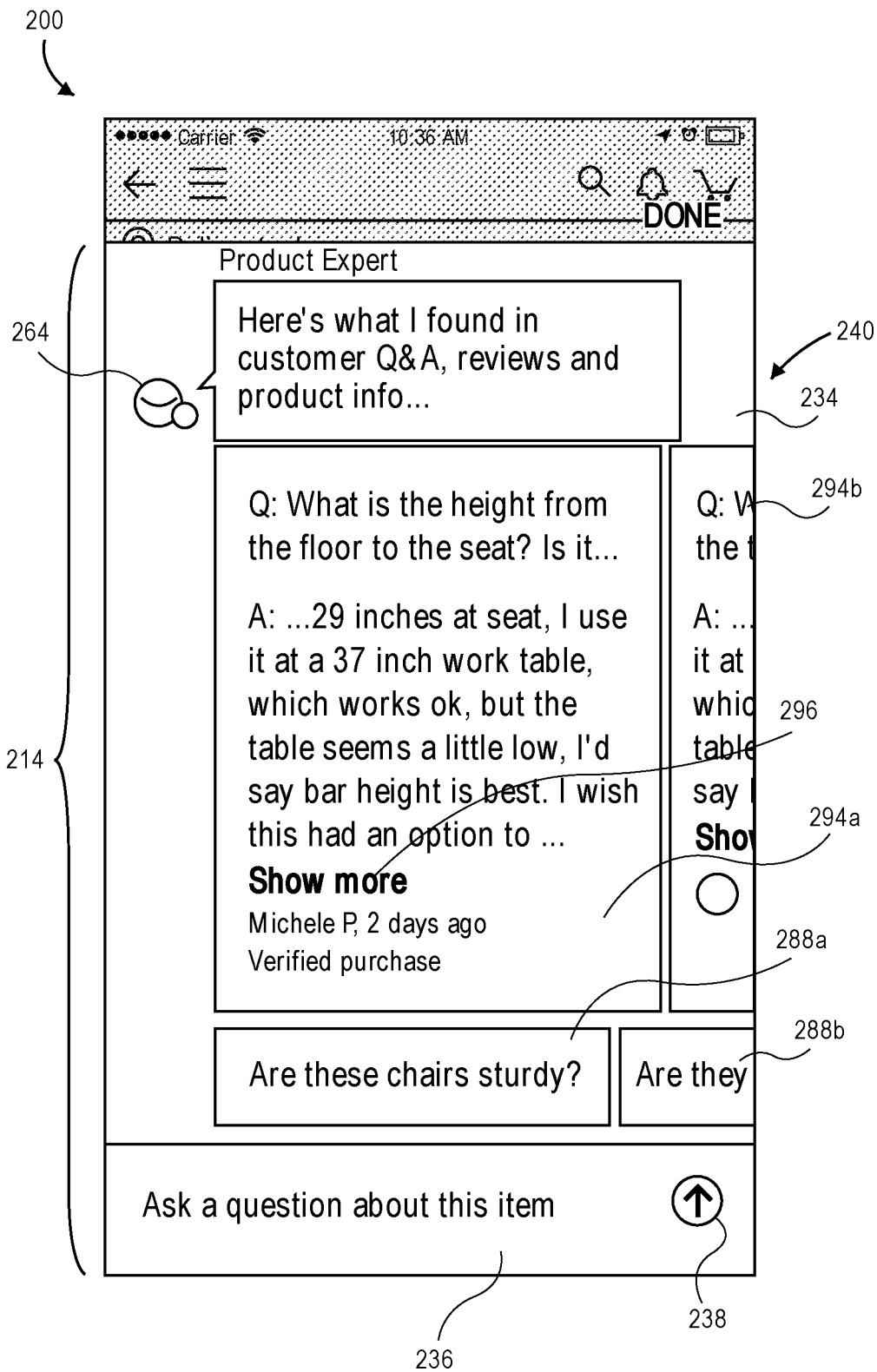
FIG. 15 illustrates an example user interface for implementing techniques relating to result refinement and item information exploration, according to at least one example.

As shown in FIG. 14, the question interface view 214 is presented as the chat window 240, including the chat view 234, the message input box 236, and the send message button 238. Using the question interface view 214, the user may select recommended questions 288a-N presented in the chat view 234 and input questions about the item 290 in the message input box 236. In some examples, the recommended questions 288 are sourced from actual questions for which the system can determine an answer, reviews, and product information. The recommended questions 288 can be those that are frequently asked, those that are most popular, those asked and answered most recently, and sorted in any other way. In some examples, the user is given the option to decide which types of questions she desires. She may do this by inputting a message in the message input box 236 (e.g., "what are the most popular questions for this item"). From this, the item description bot 264 will reply with the most popular questions.

As illustrated in FIG. 14, the recommended question 288c (e.g., "Are these stools counter height or bar height?") has been selected by a selection input 292. Based on this selection, the question interface view 214 can be updated to include the view shown in FIG. 15. In particular, in the FIG. 15, the chat view 234 has been updated to include answers 294a-294N to the recommended question 288c selected by the selection input 292. Additional answers can be revealed by right to left scrolling or by selecting a show more option 296. From the view illustrated in FIG. 15, the user may additionally select other recommended questions 288 or input her own questions into the message input box 236. If the user's question can be answered, an answer may be presented in the chat view 234. If the user's question cannot be answered, a message indicating as much may be presented in the chat view 234.

Figure 16:
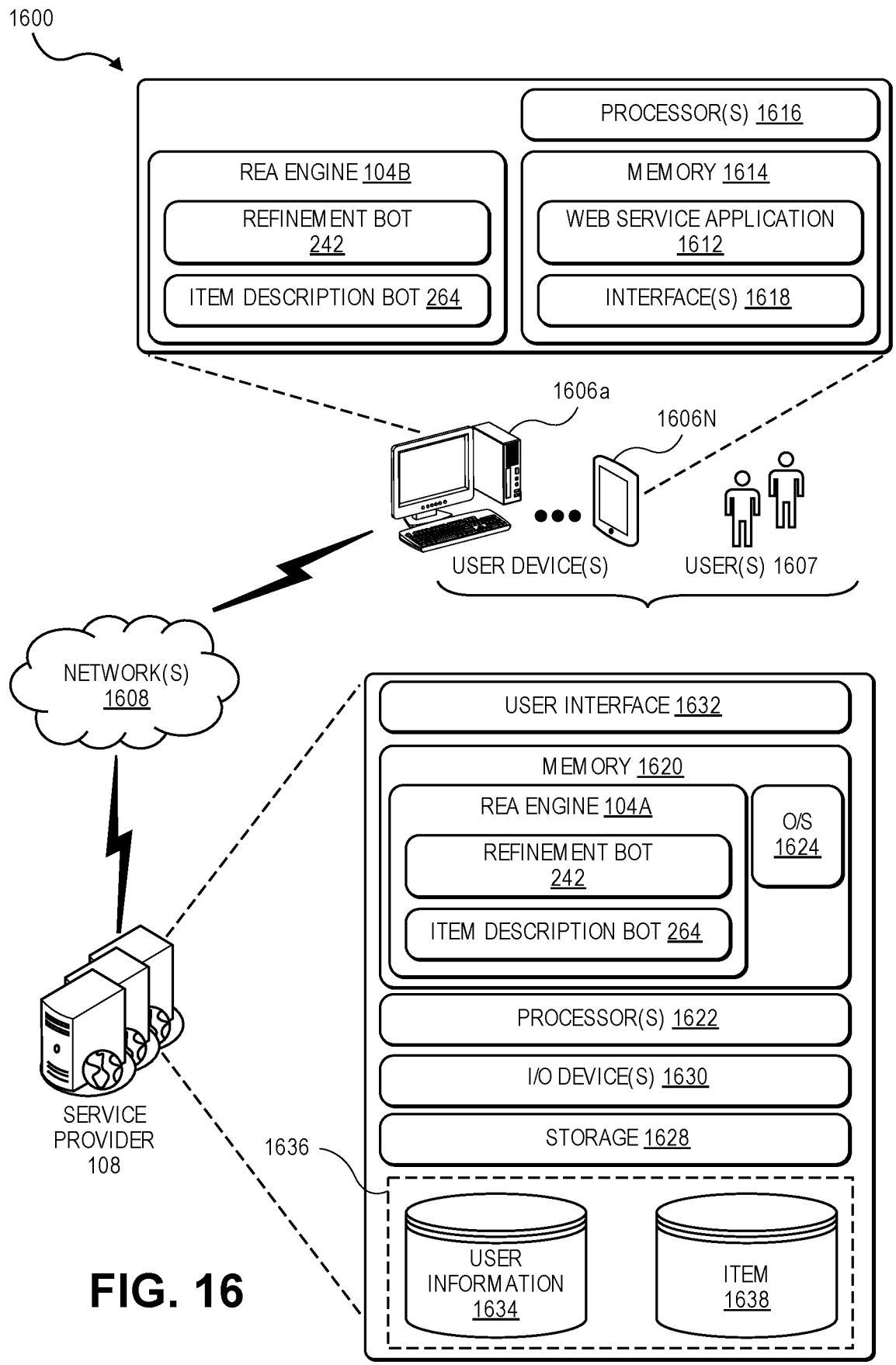
FIG. 16 is an example schematic architecture for implementing techniques relating to result refinement and item information exploration, according to at least one example.

FIG. 16 is an example schematic architecture 1600 for implementing techniques relating to result refinement and item information exploration, according to at least one example. The architecture 1600 may include the service provider 108 in communication with one or more user devices 1606a-1606N via one or more networks 1608 (hereinafter, "the network 1608").

The user device 1606, which is an example of the user device 106, may be operable by one or more users 1607 to interact with the service provider 108. The user device 1606 may be any suitable type of computing device such as, but not limited to, a wearable device, a tablet, a mobile phone, a smart phone, a network-enabled streaming device (a high-definition multimedia interface ("HDMI") microconsole pluggable device), a personal digital assistant ("PDA"), a laptop computer, a desktop computer, a thin-client device, a tablet computer, a high-definition television, a web-enabled high-definition television, a set-top box, etc. For example, the user device 1606a is illustrated as a desktop computer, while the user device 1606N is illustrated as an example of a handheld mobile device.

The user device 1606 may include a memory 1614 and processor(s) 1616. In the memory 1614 may be stored program instructions that are loadable and executable on the processor(s) 1616, as well as data generated during the execution of these programs. Depending on the configuration and type of user device 1606, the memory 1614 may be volatile (such as random access memory ("RAM")) and/or non-volatile (such as read-only memory (ROM), flash memory, etc.).

In some examples, the memory 1614 may include a web service application 1612 and a REA engine 104b. The web service application 1612 and/or the REA engine 104b may allow the user 1607 to interact with the service provider 108 via the network 1608. Such interactions may include, for example, inputting information into user interfaces, making selections, requesting web assets, searching for items, etc. The memory 1614 also includes one or more user interfaces 1618. The interfaces 1618 may enable user interaction with the user device 1606 (e.g., for inputting information using one or more input components of the user device 1606).

Turning now to the details of the service provider 108, the service provider 108 may include one or more service provider computers, perhaps arranged in a cluster of servers or as a server farm, and may host web service applications. The function of the service provider 108 may be implemented a cloud-based environment such that individual components of the service provider 108 are virtual resources in a distributed environment. The service provider 108 also may be implemented as part of an online store (not shown).

The service provider 108 may include at least one memory 1620 and one or more processing units (or processor(s)) 1622. The processor 1622 may be implemented as appropriate in hardware, computer-executable instructions, software, firmware, or combinations thereof. Computer-executable instruction, software, or firmware implementations of the processor 1622 may include computer-executable or machine-executable instructions written in any suitable programming language to perform the various functions described. The memory 1620 may include more than one memory and may be distributed throughout the service provider 108. The memory 1620 may store program instructions that are loadable and executable on the processor(s) 1622, as well as data generated during the execution of these programs. Depending on the configuration and type of memory including the service provider 108, the memory 1620 may be volatile (such as RAM and/or non-volatile (such as read-only memory ("ROM"), flash memory, or other memory). The memory 1620 may include an operating system 1624 and one or more application programs, modules, or services for implementing the features disclosed herein including at least the REA engine 104a.

The service provider 108 may also include additional storage 1628, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 1628, both removable and non-removable, is examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components, may refer to programming modules executed by computing systems (e.g., processors) that are part of the service provider 108 and/or part of the user device 1606.

The service provider 108 may also include input/output (I/O) device(s) and/or ports 1630, such as for enabling connection with a keyboard, a mouse, a pen, a voice input device, a touch input device, a display, speakers, a printer, or other I/O device.

In some examples, the service provider 108 may also include one or more user interface(s) 1632. The user interface 1632 may be utilized by an operator or other authorized user to access portions of the service provider 108. In some examples, the user interface 1632 may include a graphical user interface, voice interfaces, web-based applications, programmatic interfaces such as APIs, or other user interface configurations. The service provider 108 may also include the datastore 1636. In some examples, the datastore 1636 may include one or more databases, data structures, or the like for storing and/or retaining information associated with the service provider 108. Thus, the datastore 1636 may include data structures, such as a user information database 1634 and item information database 1638.

The user information database 1634 may be used to retain information pertaining to users of the service provider 108 such as the user 1607. Such information may include, for example, user preferences, user account information (e.g., electronic profiles for individual users), demographic information for users, payment instrument information for users (e.g., credit card, debit cards, bank account information, and other similar payment processing instruments), account preferences for users, purchase history of users, wish-lists of users, search histories for users, and other similar information pertaining to a particular user, and sets of users, of the service provider 108.

The item information database 1638 may include a record of all items, services, and the like that are searchable using the techniques described herein. For example, when search queries relate to items offered in connection with an online store, the item information database 1638 may store records corresponding to these items. This may include information that is used to generate an item description page (e.g., product title, price, description, images, ratings, reviews, questions and answers, etc.). In some examples, information from the item information database 1638 may be used to enable the question interface views described herein. The REA engine 104, including the refinement bot 242 and the item description bot 264, may access the user information database 1634 and the item information database 1638 to implement the techniques described herein.

FIGS. 17, 18, 19, and 20 illustrate example flow diagrams showing respective processes 1700, 1800, 1900, and 2000, as described herein. These processes 1700, 1800, 1900, and 2000 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 17:
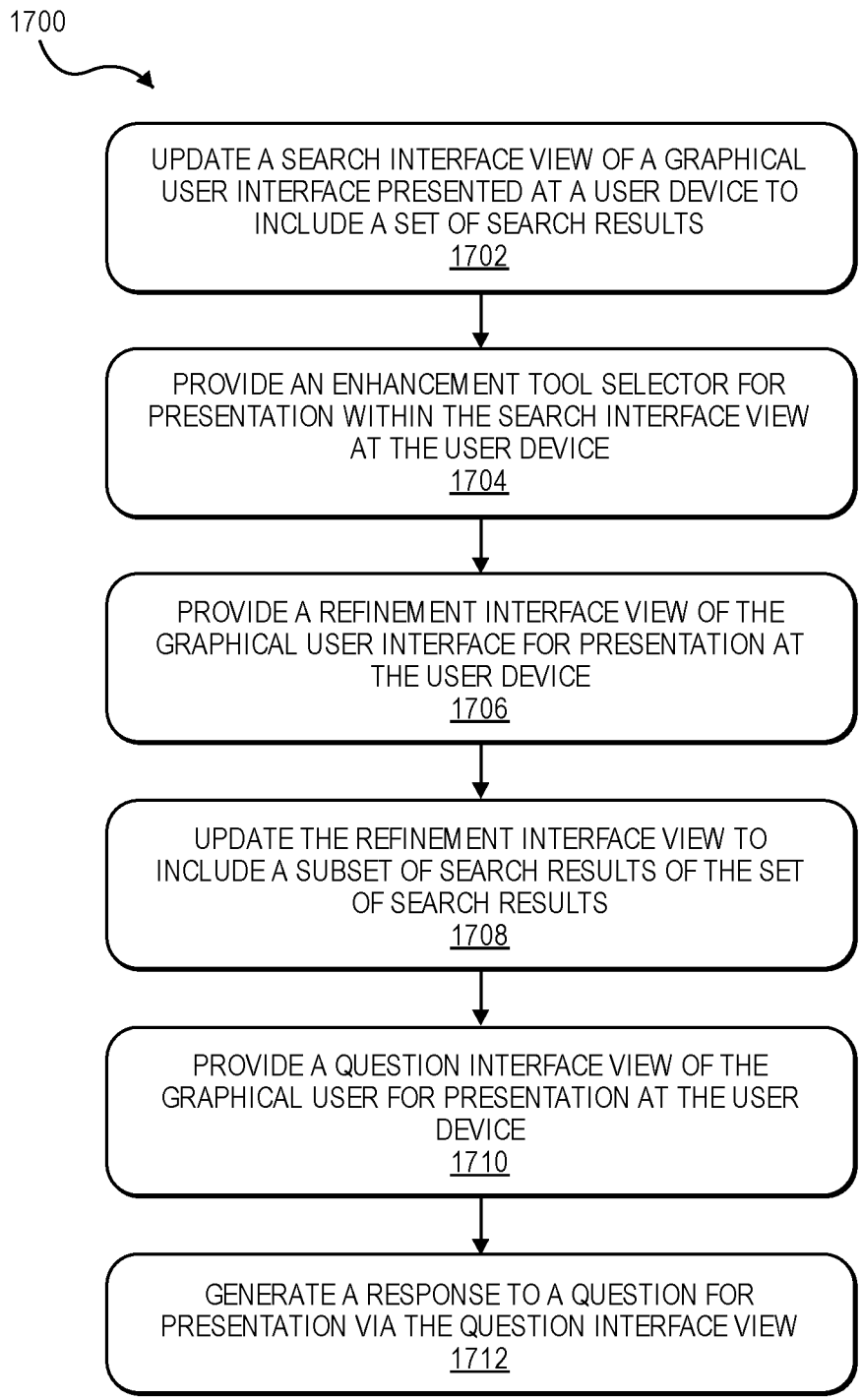
FIG. 17 is an example flow diagram depicting example acts for implementing techniques relating to result refinement and item information exploration, according to at least one example.

FIG. 17 is flow diagram of process 1700 depicting example acts for implementing techniques relating to result refinement and item information exploration, according to at least one example. The REA engine 104 (FIG. 1) embodied in the service provider 108 (FIG. 1) and/or within the user device 106 (FIG. 1) may perform the process 1700. The process 1700 may begin at 1702 by updating a search interface view of a graphical user interface presented at a user device to include a set of search results. The updating may be based at least in part on a first user input that includes a search query. The set of search results may correspond to a set of items associated with the search query. A user may input the search query to search for items available in connection with an online store.

At 1704, the process 1700 may include providing an enhancement tool selector for presentation within the search interface view at the user device. The providing may be based at least in part on triggering information. The enhancement tool selector may be an icon, text box input box, or other graphical element that, when selected or otherwise interacted with, enables further refinement of the search results or exploration of an item corresponding to one of the search results. In some examples, the triggering information is based at least in part on the search query, a subsequent user input that scrolls the set of items presented in the search interface view, a set of subsequent user inputs that represents navigation between the set of search results presented in the search interface view and individual item description views associated with individual items from the set of items, and/or contextual information associated with a user of the user device.

At 1706, the process 1700 may include providing a refinement interface view of the graphical user interface for presentation at the user device. The providing may be based at least in part on a second user input that selects the enhancement tool selector. In some examples, the refinement interface view is configured to enable user interaction with a refinement bot to refine the set of search results.

At 1708, the process 1700 may include updating the refinement interface view to include a subset of search results of the set of search results. The updating may be based at least in part on a third user input that selects at least one search filter. The search filter may be suggested by the refinement bot.

At 1710, the process 1700 may include providing a question interface view of the graphical user interface for presentation at the user device. The providing may be based at least in part on a fourth user input that selects a search result of the subset of search results. In some examples, the search result corresponds to an item from the set of items. In some examples, the question interface view is configured to enable user interaction with an item description bot to ask questions about the item.

At 1712, the process 1700 may include generating a response to a question for presentation via the question interface view. The question can be received via the question interface view and the response can correspond to the item. For example, the response can be automatically generated based on questions posed by other users and answers by other users, product experts, sellers, etc.

In some examples, the process 1700 may further include receiving the question by at least one of receiving the question via a text input box of the question interface view or receiving the question via user selection of a pre-generated question presented within the question interface view.

Figure 18:
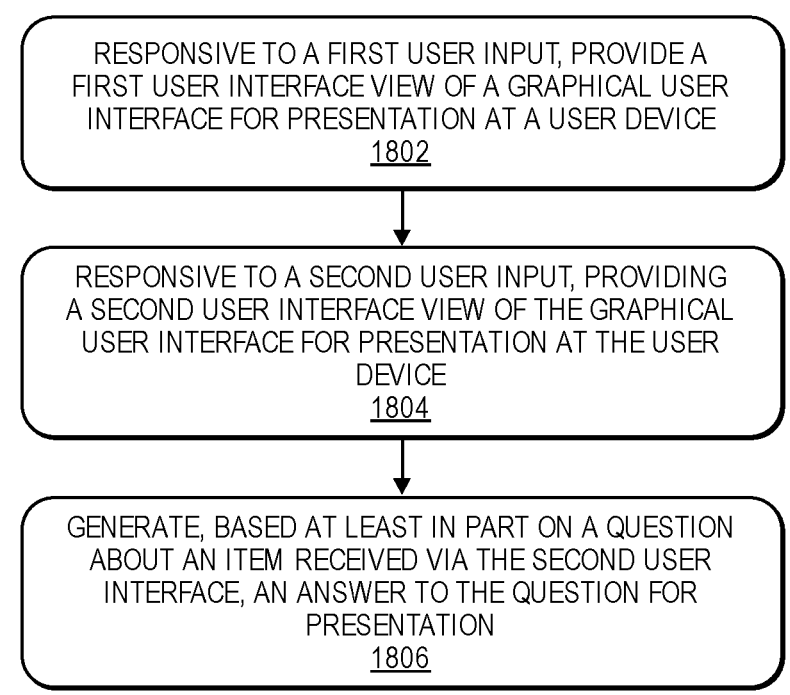
FIG. 18 is an example flow diagram depicting example acts for implementing techniques relating to result refinement and item information exploration, according to at least one example.

FIG. 18 is flow diagram of process 1800 depicting example acts for implementing techniques relating to result refinement and item information exploration, according to at least one example. The REA engine 104 (FIG. 1) embodied in the service provider 108 (FIG. 1) and/or within the user device 106 (FIG. 1) may perform the process 1800. The process 1800 may begin at 1802 by, responsive to a first user input, providing a first user interface view of a graphical user interface for presentation at a user device. The first user interface view may present a set of items. The first user input may select an enhancement tool selector. In some examples, the first user interface view is configured to enable first user interaction with a refinement bot to refine the set of items.

In some examples, the process 1800 may further include, prior to providing the first user interface view for presentation at the user device, determining whether to present the enhancement tool selector based at least in part on triggering information. The triggering information may be representative of at least one of presenting a set of search results generated based at least in part on a search query, scrolling the set of search results, an item search history associated with a user of the user device, and/or an item browsing history associated with the user.

At 1804, the process 1800 may include, responsive to a second user input, providing a second user interface view of the graphical user interface for presentation at the user device. The second user interface view may include a representation of the item. The second user input may select an item from the set of items. In some examples, the second user interface view is configured to enable second user interaction with an item description bot to ask questions about the item.

At 1806, the process 1800 may include generating, based at least in part on a question about the item received via the second user interface view, an answer to the question for presentation. In some examples, generating the answer may include matching the question to one of a set of predefined answers sourced from an item record associated with the item.

In some examples, the question is a computer-generated question that is based at least in part on a previously-asked question associated with the item or a popular question associated with the item. The question can be received via the second user interface view as a user selection that selects the question. For example, the question can be received via the second user interface as text that is input into a text box presented within the second user interface view.

In some examples, the process 1800 may further include updating the second user interface view to include an option to purchase the item.

In some examples, the process 1800 may further include identifying one or more recommended items based at least in part on the question about the item, and updating the second user interface view to include the one or more recommended items.

In some examples, the process 1800 may further include, prior to providing the first user interface view for presentation at the user device: receiving a search query corresponding to an item offered by an online store, generating a set of search results based at least in part on the search query, and providing a subset of the set of search results for presentation at the user device.

In some examples, the process 1800 may further include providing the enhancement tool selector for presentation at the user device as a graphical element that overlays at least a portion of the subset of the set of search results, or providing the enhancement tool selector for presentation at the user device as a text box positioned adjacent to the subset of the set of search results.

Figure 19:
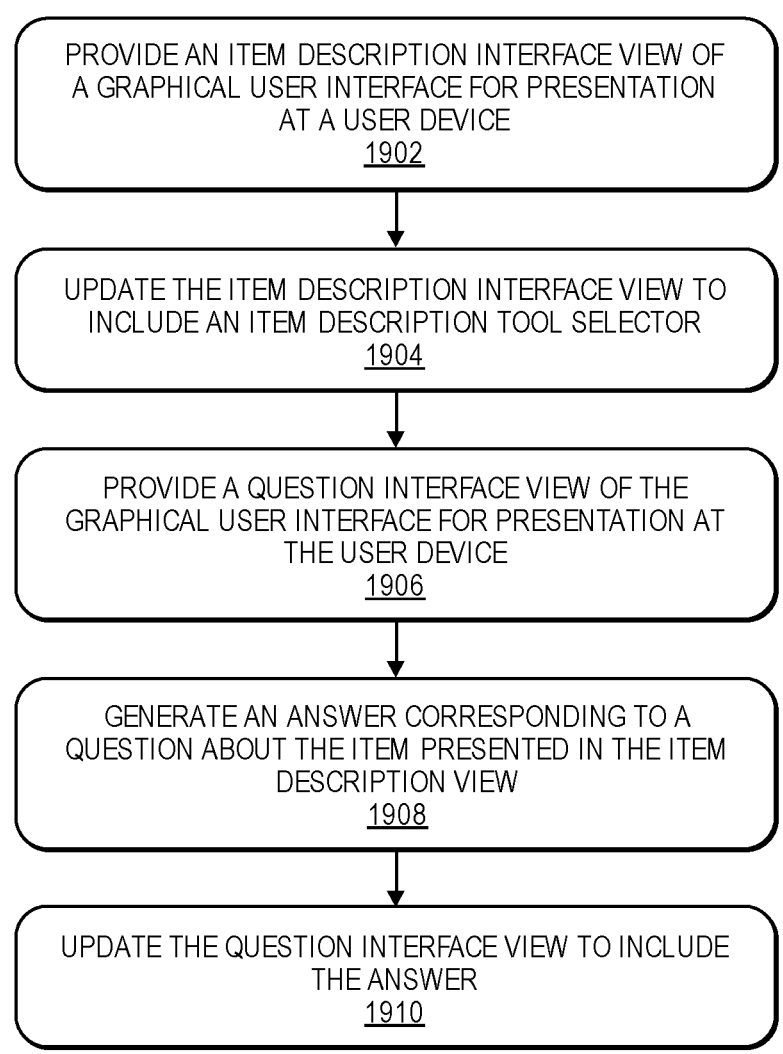
FIG. 19 is an example flow diagram depicting example acts for implementing techniques relating to result refinement and item information exploration, according to at least one example.

FIG. 19 is flow diagram of process 1900 depicting example acts for implementing techniques relating to result refinement and item information exploration, according to at least one example. The REA engine 104 (FIG. 1) embodied in the service provider 108 (FIG. 1) and/or within the user device 106 (FIG. 1) may perform the process 1900. The process 1900 may begin at 1902 by, providing an item description interface view of a graphical user interface for presentation at a user device. The item description interface view may identify an item.

At 1904, the process 1900 may include updating the item description interface view to include an item description tool selector. This may be based at least in part detection of a trigger.

At 1906, the process 1900 may include providing a question interface view of the graphical user interface for presentation at the user device. This may be based at least in part on a first user input that selects the item description tool selector.

At 1908, the process 1900 may include generating an answer corresponding to a question about the item presented in the item description interface view.

At 1910, the process 1900 may include updating the question interface view to include the answer.

In some examples, the process 1900 may further include generating the question about the item based at least in part on one or more of a previous question about the item, a popular question about the item, and/or a relevant question about the item based at least in part on contextual information associated with a user of the user device.

In some examples, the process 1900 may further include updating the question interface view to include the question, and receiving, via the question interface view, a second user input that selects the question.

In some examples, the process 1900 may further include receiving the question as a second user input that is received via the question interface view.

In some examples, the process 1900 may further include identifying one or more recommended items based at least in part on the question about the item and the response, and updating the question interface view to include the one or more recommended items.

Figure 20:
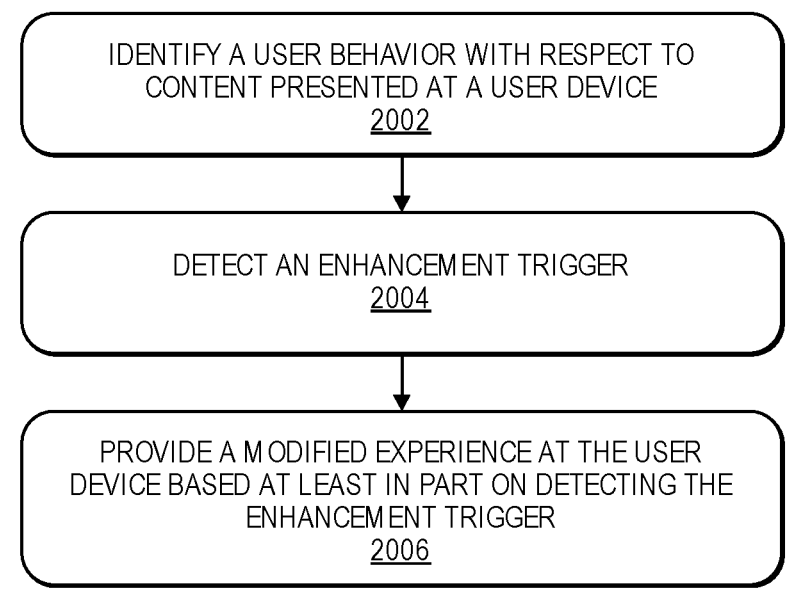
FIG. 20 is an example flow diagram depicting example acts for implementing techniques relating to result refinement and item information exploration, according to at least one example.

FIG. 20 is flow diagram of process 2000 depicting example acts for implementing techniques relating to result refinement and item information exploration, according to at least one example. The REA engine 104 (FIG. 1) embodied in the service provider 108 (FIG. 1) and/or within the user device 106 (FIG. 1) may perform the process 2000. The process 2000 may begin at 2002 by identifying a user behavior with respect to content presented at a user device. Identifying the user behavior may be performed by at least tracking user interactions with the content. For example, the content can be presented in an application or web browser and the REA engine 104 can track how a user is interacting with the content (e.g., inputting text, scrolling, selecting elements, navigating, etc.). These interactions can be defined in terms of triggering information. The content can be any suitable combination of user interface elements. For example, the content can include a set of search results, an item detailed description page, a social media page, a webpage, a news article, a blog post, and any other electronic content. The user interactions may include at least one of scrolling the content, clicking on interface elements associated with the content, or paging between a page that includes the content and other pages dedicated to other portions of the content.

At 2004, the process 2000 may include detecting an enhancement trigger. This may be performed by at least comparing the user behavior with a pattern of behavior associated with the enhancement trigger. In some examples, the user behavior and the pattern of behavior are defined in terms of triggering information. The pattern of behavior may be used to infer an intent of the user. For example, the pattern of behavior can define that a particular a sequence of user interactions is evidence that the user is trying find a particular item. Continuing with this example, if the content is a listing of jobs and the user interactions include the user opening and closing different listings, this may be used to determine that the user is looking for a job. This determination may cause detection of the enhancement trigger, which is used to determine when, and sometimes how, to present a modified experience. The modified experience can include changes to the view of the user interface, present user interface elements, present options for adjusting the content, and enable other options. In some examples, the pattern of behavior is defined by first triggering information. In this example, detecting the enhancement trigger may include comparing second triggering information associated with the user behavior with the first triggering information.

At 2006, the process 2000 may include providing a modified experience at the user device based at least in part on detecting the enhancement trigger. The modified experience can include a user interface for interacting with a chat bot (e.g., refinement bot, item description bot, and/or other suitable bot). In some examples, providing the modified experience at the user device based at least in part on detecting the enhancement trigger may include: responsive to detecting the enhancement trigger, presenting an enhancement tool selector at the user device; and receiving a user input that selects the enhancement tool selector. In this manner, selection of the enhancement tool selector may cause presentation of the modified user experience.

In some examples, the content may include a set of search results corresponding to a search query received at the user device. In this example, the user interface may be configured to receive an additional user input, and the chat bot (e.g., a refinement bot) may be configured to refine the set of search results based at least in part on the additional user input. The additional input can include selection of one of a set of predefined filters, input of text at a text entry box, and any other suitable additional input.

In some examples, the content may include an item available in connection with an online store. In this example, the user interface may be configured to receive an additional user input in the form of a question about the item, and the chat bot (e.g., item description bot) may be configured to provide an answer corresponding to the question. In some examples, the additional user input may include a textual user input that defines the question or a user selection of the question (e.g., from a predefined set of questions).

In some examples, the content may include one or more items (e.g., items available for purchase at an online store). In this example, the process 2000 may also include updating the user interface to include an option to purchase an item of the one or more items.

In some examples, the process 2000 may further include, after providing the modified experience: receiving, via the user interface, one or more questions about the content, generating one or more answers corresponding to the one or more questions based on user-provided questions and answer sets associated with the content, and providing, via the user interface, the one or more answers for presentation.

In some examples, the user interface may be configured to enable a first set of user interactions with the chat bot (e.g., a refinement bot). In this example, the process 2000 may further include providing an additional modified experience at the user device based at least in part on additional user input received via the user interface, the additional modified experience may include an additional user interface that is configured to enable a second set of user interactions with an additional chat bot (e.g., an item description bot). In some examples, at least one user interaction of the first set of user interactions is a refinement interaction that refines the content. In some examples, at least one user interaction of the second set of user interactions is a question interaction that provides answers to questions about the content.

Figure 21:
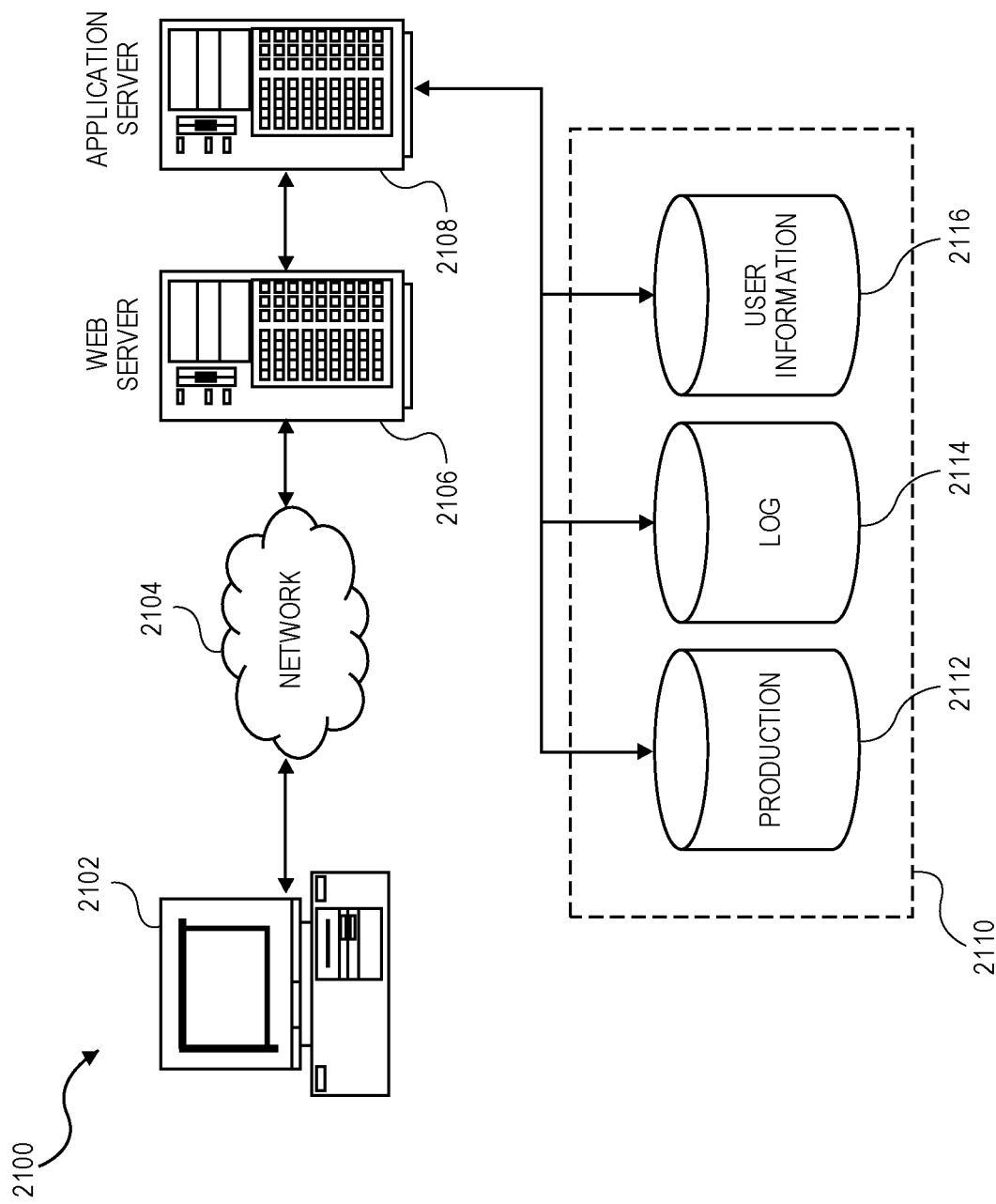
FIG. 21 is an example schematic environment for implementing techniques relating to result refinement and item information exploration, according to at least one example.

FIG. 21 illustrates aspects of a system 2100 for implementing aspects in accordance with various examples. As will be appreciated, although a Web-based environment is used for purposes of explanation, different environments may be used, as appropriate, to implement various examples. The environment includes a user device 2102, which can include any appropriate device operable to send and receive requests, messages, or information over an appropriate network 2104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2106 for receiving requests and serving content in response thereto, although for other networks an alternative device serving a similar purpose could be used as would be apparent to one of ordinary skill in the art.

The illustrative environment includes at least one application server 2108 and a data store 2110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 2102 and the application server 2108, can be handled by the Web server. It should be understood that the Web and application servers are not required and are merely example components, as structured code discussed herein can be executed on any appropriate device or host machine as discussed elsewhere herein.

The data store 2110 can include several separate data tables, databases or other data storage mechanisms and media for storing data relating to a particular aspect. For example, the data store illustrated includes mechanisms for storing production data 2112 and user information 2116, which can be used to serve content for the production side. The data store also is shown to include a mechanism for storing log data 2114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 2110. The data store 2110 is operable, through logic associated therewith, to receive instructions from the application server 2108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 2102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 21. Thus, the depiction of the system 2100 in FIG. 21 should be taken as being illustrative in nature and not limiting to the scope of the disclosure.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    updating, based at least in part on a first user input that comprises a search query, a search interface view of a graphical user interface presented at a user device to include a set of search results corresponding to a set of items associated with the search query;
    providing, based at least in part on triggering information, an enhancement tool selector for presentation within the search interface view at the user device, wherein the triggering information represents user interactions with the set of search results, the user interactions are indicative of continued user searching within the set of search results, and the triggering information is useable to detect an enhancement trigger;
    providing, based at least in part on a second user input that selects the enhancement tool selector, a refinement interface view of the graphical user interface for presentation at the user device;
    updating, based at least in part on a third user input that corresponds to at least one search filter, the refinement interface view to include a subset of search results of the set of search results;
    providing, based at least in part on a fourth user input that selects a search result of the subset of search results, a question interface view of the graphical user interface for presentation at the user device, the search result corresponding to an item from the set of items;
    receiving, via the question interface view, information associated with a question presented at the question interface view, the information being received (i) as a user text input at the question interface view or (ii) as a user selection from a set of suggested questions presented at the question interface view, the question corresponding to the item; and generating a response to the question for presentation via the question interface view, the response corresponding to the item.

2. The computer-implemented method of claim 1, wherein the user interactions with the set of search results comprise at least one of a subsequent user input that scrolls the set of search results presented in the search interface view or a set of subsequent user inputs that represents navigation between the set of search results presented in the search interface view and individual item description views associated with individual items from the set of items.

3. The computer-implemented method of claim 1, wherein the refinement interface view is configured to enable other user interactions with a refinement bot to refine the set of search results.

4. The computer-implemented method of claim 1, wherein the question interface view is configured to enable other user interactions with an item description bot to ask and answer questions about the item.

5. The computer-implemented method of claim 1, wherein generating the response to the question comprises generating the response based at least on part on a specific question posed by first user and an answer corresponding to the specific question received from a second user.

6. The computer-implemented method of claim 1, wherein generating the response to the question comprises generating the response based at least in part on the information associated with the question.

7. The computer-implemented method of claim 1, wherein the user interactions that are indicative of continued user searching within the set of search results comprise at least one of (i) scrolling through the set of search results or (ii) viewing of individual search results of the set of search results and returning to the set of search results after viewing the individual search results.

8. A computer-implemented method, comprising:
 identifying a user behavior with respect to a set of search results presented at a user device by at least tracking user interactions with the set of search results, wherein the user interactions are indicative of continued user searching within the set of search results;
 detecting an enhancement trigger by at least comparing the user behavior with a pattern of behavior associated with the enhancement trigger; and
 providing a modified experience at the user device based at least in part on detecting the enhancement trigger, the modified experience comprising a user interface for interacting with a chat bot, wherein the user interface is configured to receive an additional user input in the form of (i) a user question about an item or (ii) a user selection from a set of suggested questions presented at the user interface, and wherein the chat bot is configured to provide an answer corresponding to the user question.

9. The computer-implemented method of claim 8, wherein providing the modified experience at the user device based at least in part on detecting the enhancement trigger further comprises:
 responsive to detecting the enhancement trigger, presenting an enhancement tool selector at the user device; and
 receiving information indicating that a user input has selected the enhancement tool selector.

10. The computer-implemented method of claim 8, wherein the user interactions comprise at least one of scrolling the set of search results, clicking on interface elements associated with the set of search results, or paging between a page that includes the set of search results and other pages dedicated to other portions of the set of search results.

11. The computer-implemented method of claim 8, wherein the chat bot is configured to refine the set of search results based at least in part on the additional user input.

12. The computer-implemented method of claim 8, wherein:
 the pattern of behavior associated with the enhancement trigger is defined by first triggering information; and
 detecting the enhancement trigger comprises comparing second triggering information associated with the user behavior with the first triggering information.

13. The computer-implemented method of claim 8, wherein:
 the set of search results comprise one or more items; and
 the method further comprises updating the user interface to include an option to purchase an item of the one or more items.

14. The computer-implemented method of claim 8, further comprising, after providing the modified experience:
 receiving, via the user interface, one or more questions about the set of search results;
 generating one or more answers corresponding to the one or more questions based on user-provided questions and answer sets associated with the item; and
 providing, via the user interface, the one or more answers for presentation.

15. The computer-implemented method of claim 8, wherein:
 the user interface is configured to enable a first set of user interactions with the chat bot; and
 the method further comprises providing an additional modified experience at the user device based at least in part on different user input received via the user interface, the additional modified experience comprising an additional user interface that is configured to enable a second set of user interactions with an additional chat bot.

16. The computer-implemented method of claim 15, wherein:
 at least one user interaction of the first set of user interactions is a refinement interaction that refines the set of search results;
 at least one user interaction of the second set of user interactions is a question interaction that provides answers to questions about the set of search results.

17. One or more non-transitory computer-readable storage media comprising computer-executable instructions that, when executed by one or more computer systems, cause the one or more computer systems to perform operations comprising:
 providing an item description interface view of a graphical user interface for presentation at a user device, the item description interface view identifying an item;
 detecting a trigger based at least in part on triggering information that represents user interaction with the item description interface view, wherein the user interaction is indicative of continued user searching relating to the item identified in the item description interface view;
 updating, based at least in part detecting the trigger, the item description interface view to include an item enhancement tool selector;
 providing, based at least in part on a first user input that selects the item enhancement tool selector, a question interface view of the graphical user interface for presentation at the user device;

receiving, via the question interface view, information associated with a question presented at the question interface view, the information being received (i) as a user text input at the question interface view or (ii) as a user selection from a set of suggested questions presented at the question interface view, the question corresponding to the item;

generating an answer corresponding to the question about the item presented in the item description interface view; and updating the question interface view to include the answer.

18. The one or more non-transitory computer-readable storage media of claim 17, wherein the one or more computer-readable storage media comprise further computer-executable instructions that, when executed by the one or more computer systems, further cause the one or more computer systems to perform operations comprising:

generating the question about the item based at least in part on one or more of a previous question about the item, a popular question about the item, or a relevant question about the item based at least in part on contextual information associated with a user of the user device; and updating the question interface view to include the question.

19. The one or more non-transitory computer-readable storage media of claim 17, wherein the one or more computer-readable storage media comprise further computer-executable instructions that, when executed by the one or more computer systems, further cause the one or more computer systems to perform operations comprising:

identifying one or more recommended items based at least in part on the question about the item and a response about the item; and updating the question interface view to include the one or more recommended items.

\* \* \* \* \*